US010540973B2

(12) United States Patent
Jaygarl et al.

(10) Patent No.: US 10,540,973 B2
(45) Date of Patent: Jan. 21, 2020

(54) ELECTRONIC DEVICE FOR PERFORMING OPERATION CORRESPONDING TO VOICE INPUT

(71) Applicant: Samsung Electronics Co., Ltd., Suwon-si, Gyeonggi-do (KR)

(72) Inventors: Ho Jun Jaygarl, Hwaseong-si (KR); Jin Woong Kim, Yongin-si (KR); Jae Gun No, Suwon-si (KR); Jae Young Yang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/992,906

(22) Filed: May 30, 2018

(65) Prior Publication Data

US 2018/0374481 A1    Dec. 27, 2018

(30) Foreign Application Priority Data

Jun. 27, 2017 (KR) .................. 10-2017-0081421

(51) Int. Cl.
*G10L 15/22* (2006.01)
*G10L 15/26* (2006.01)
(Continued)

(52) U.S. Cl.
CPC ............ *G10L 15/22* (2013.01); *G10L 15/265* (2013.01); *G10L 15/30* (2013.01); *G10L 15/142* (2013.01);
(Continued)

(58) Field of Classification Search
CPC ....... G10L 15/22; G10L 15/18; G10L 15/265; G10L 15/30; G10L 15/142; G10L 15/16;
(Continued)

(56) References Cited

U.S. PATENT DOCUMENTS 8,516,114 B2   8/2013 Banavar et al.
8,660,849 B2   2/2014 Gruber et al.
(Continued)

FOREIGN PATENT DOCUMENTS

EP   1 657 709 A1   5/2006
EP   3 010 015 A1   4/2016
(Continued)

OTHER PUBLICATIONS

European Search Report dated Nov. 27, 2018, issued in European Patent Application No. 18179831.5.
(Continued)

*Primary Examiner* — Quynh H Nguyen
(74) *Attorney, Agent, or Firm* — Jefferson IP Law, LLP

(57) ABSTRACT

An electronic device is provided. The electronic device includes a housing, a speaker, a microphone, a display, a communication circuit, at least one processor operatively connected to the speaker, the microphone, the display, and the communication circuit, and a memory operatively connected to the at least one processor, and storing instructions to cause the at least one processor to receive a first user utterance, including a request to perform a task by using an application program, through the microphone, transmit first data associated with the first user utterance to an external server, receive second data including a text generated by an automatic speech recognition (ASR) module, from the external server, identify the application program based on the second data, receive a first response including information of a sequence of states of the electronic device from the external server to perform at least part of the task, and perform the at least part of the task by controlling the electronic device to enter the sequence of the states by using the application program.

20 Claims, 15 Drawing Sheets

(51) Int. Cl.
*G10L 15/30* (2013.01)
*G10L 15/14* (2006.01)
*G10L 15/16* (2006.01)
*G10L 15/18* (2013.01)

(52) U.S. Cl.
CPC .......... *G10L 15/16* (2013.01); *G10L 15/1815* (2013.01); *G10L 2015/223* (2013.01)

(58) Field of Classification Search
CPC .......... G10L 15/1815; G10L 2015/223; G06F 3/04842
USPC .................................................. 704/265, 235
See application file for complete search history.

(56) References Cited

U.S. PATENT DOCUMENTS

| | | | |
|---|---|---|---|
| 8,670,979 B2 | 3/2014 | Gruber et al. | |
| 8,706,503 B2 | 4/2014 | Cheyer et al. | |
| 8,731,942 B2 | 5/2014 | Cheyer et al. | |
| 8,799,000 B2 | 8/2014 | Guzzoni et al. | |
| 8,892,446 B2 | 11/2014 | Cheyer et al. | |
| 8,903,716 B2 | 12/2014 | Chen et al. | |
| 8,930,191 B2 | 1/2015 | Gruber et al. | |
| 8,942,985 B2 | 1/2015 | Mowatt et al. | |
| 8,942,986 B2 | 1/2015 | Cheyer et al. | |
| 8,949,420 B2 | 2/2015 | Banavar et al. | |
| 9,117,447 B2 | 8/2015 | Gruber et al. | |
| 9,318,108 B2 | 4/2016 | Gruber et al. | |
| 9,548,050 B2 | 1/2017 | Gruber et al. | |
| 9,972,317 B2 | 5/2018 | Mowatt et al. | |
| 10,191,718 B2 | 1/2019 | Rhee et al. | |
| 2003/0187984 A1 | 10/2003 | Banavar et al. | |
| 2006/0106614 A1 | 5/2006 | Mowatt et al. | |
| 2008/0103779 A1* | 5/2008 | Huang .................. | G10L 15/28 704/275 |
| 2009/0287750 A1 | 11/2009 | Banavar et al. | |
| 2012/0016678 A1 | 1/2012 | Gruber et al. | |
| 2012/0245944 A1 | 9/2012 | Gruber et al. | |
| 2013/0110505 A1 | 5/2013 | Gruber et al. | |
| 2013/0110515 A1 | 5/2013 | Guzzoni et al. | |
| 2013/0110518 A1 | 5/2013 | Gruber et al. | |
| 2013/0110519 A1 | 5/2013 | Cheyer et al. | |
| 2013/0110520 A1 | 5/2013 | Cheyer et al. | |
| 2013/0111348 A1 | 5/2013 | Gruber et al. | |
| 2013/0111487 A1 | 5/2013 | Cheyer et al. | |
| 2013/0117022 A1 | 5/2013 | Chen et al. | |
| 2013/0185074 A1 | 7/2013 | Gruber et al. | |
| 2013/0185081 A1 | 7/2013 | Cheyer et al. | |
| 2014/0278403 A1 | 9/2014 | Jacob et al. | |
| 2015/0088525 A1 | 3/2015 | Shan et al. | |
| 2015/0095030 A1 | 4/2015 | Mowatt et al. | |
| 2015/0199965 A1* | 7/2015 | Leak ..................... | G10L 15/22 704/249 |
| 2016/0104484 A1 | 4/2016 | Chakladar et al. | |
| 2016/0266872 A1 | 9/2016 | Jeon et al. | |
| 2017/0032786 A1 | 2/2017 | Mowatt et al. | |
| 2017/0178626 A1 | 6/2017 | Gruber et al. | |
| 2018/0150280 A1 | 5/2018 | Rhee et al. | |

FOREIGN PATENT DOCUMENTS

| | | |
|---|---|---|
| EP | 3 327 719 A1 | 5/2018 |
| KR | 10-2006-0055313 A | 5/2006 |
| KR | 10-2016-0011620 A | 2/2016 |
| KR | 10-2016-0043836 A | 4/2016 |
| KR | 10-2018-0116726 A | 10/2018 |
| WO | 2015/043200 A1 | 4/2015 |

OTHER PUBLICATIONS

Korean Notice of Allowance dated Nov. 28, 2019, issued in Korean Application No. 10-2017-0081421.

* cited by examiner

ELECTRONIC DEVICE FOR PERFORMING OPERATION CORRESPONDING TO VOICE INPUT

CROSS-REFERENCE TO RELATED APPLICATION(S)

This application is based on and claims priority under 35 U.S.C. § 119(a) of a Korean patent application number 10-2017-0081421, filed on Jun. 27, 2017, in the Korean Intellectual Property Office, the disclosure of which is incorporated by reference herein its entirety.

TECHNICAL FIELD

The disclosure relates to a technology for processing a voice input entered into an electronic device. More particularly, the disclosure relates to an electronic device configured to bind an application program (app) such that an electronic device performs a speech recognition service corresponding to a user's utterance.

BACKGROUND

In addition to an input scheme using a keyboard or a mouse, an electronic device has recently supported various input schemes such as a voice input and the like. For example, in a state where a speech recognition service is executed, an electronic device such as a smartphone or tablet may recognize the user's voice input. When the user's voice input is recognized, the electronic device may perform an operation corresponding to the voice input.

The above information is presented as background information only to assist with an understanding of the disclosure. No determination has been made, and no assertion is made, as to whether any of the above might be applicable as prior art with regard to the disclosure.

SUMMARY

An electronic device may communicate with an external server to perform an operation. For example, the electronic device may transmit a voice input to the external server. The external server may change the voice input into text data and may generate a path rule based on the text data. The generated path rule may be transmitted to the electronic device, and the electronic device may bind an app (or application) corresponding to the path rule. The electronic device may execute the bound app or may transmit a command corresponding to the path rule to the bound app for the purpose of performing an operation corresponding to the voice input.

It may take a predetermined time for the electronic device to bind the app based on the operations described above. Therefore, it may take a long time from the time when the electronic device receives the voice input to the time when the operation corresponding to the voice input is performed. When it takes a long time to perform the operation corresponding to the voice input, the user may feel inconvenience in using the speech recognition service.

Aspects of the present disclosure are to address at least the above-mentioned problems and/or disadvantages and to provide at least the advantages described below. Accordingly, an aspect of the present disclosure is to provide a method of binding an app such that an electronic device performs a speech recognition service corresponding to a user's utterance.

In accordance with an aspect of the disclosure, an electronic device is provided. The electronic device includes a housing, a speaker disposed in a first area of the housing, a microphone disposed in a second area of the housing, a display disposed in a third area of the housing, a communication circuit disposed inside the housing or attached to the housing, at least one processor disposed inside the housing and operatively connected to the speaker, the microphone, the display, and the communication circuit, and a memory disposed inside the housing, operatively connected to the at least one processor, and storing a plurality of application programs and instructions. The instructions, when executed, cause the at least one processor to receive a first user utterance including a request to perform a task by using at least one of the application programs, through the microphone, to transmit first data associated with the first user utterance to at least one external server through the communication circuit, to receive second data including a text generated by an automatic speech recognition (ASR) module, from the external server through the communication circuit, to identify the at least one of the application programs based on at least part of the second data, after identifying the at least one of the application programs, to receive a first response including information associated with a sequence of states of the electronic device from the external server through the communication circuit to perform at least part of the task, and to perform the at least part of the task by controlling the electronic device to enter the sequence of the states by using the at least one of the application programs.

In accordance with another aspect of the disclosure, an electronic device is provided. The electronic device includes a housing, a speaker disposed in a first area of the housing, a microphone disposed in a second area of the housing, a display disposed in a third area of the housing, a communication circuit disposed inside the housing or attached to the housing, at least one processor disposed inside the housing and operatively connected to the speaker, the microphone, the display, and the communication circuit, and a memory disposed inside the housing, operatively connected to the at least one processor, and storing a plurality of application programs and instructions. The instructions, when executed, cause the at least one processor to receive a user utterance through the microphone, transmit the user utterance to an external server through the communication circuit, receive text data corresponding to the user utterance from the external server through the communication circuit, identify a first application program of the application programs based on at least part of the text data, establish communication between the first application program and a control program capable of executing the application programs, receive a sequence of states of the electronic device from the external server, compare the first application program and a second application program executable based on the sequence, and execute the first application program or the second application program based on the comparison result.

In accordance with another aspect of the disclosure, an electronic device is provided. The electronic device includes a housing, a speaker disposed in a first area of the housing, a microphone disposed in a second area of the housing, a display disposed in a third area of the housing, a communication circuit disposed inside the housing or attached to the housing, at least one processor disposed inside the housing and operatively connected to the speaker, the microphone, the display, and the communication circuit, and a memory disposed inside the housing, connected to the at least one processor, and storing a plurality of application programs and instructions. The instructions, when executed, cause the at least one processor to receive a first user utterance including a request to perform a task by using at least one of the application programs, through the microphone by using at least one of the application programs, compare the first user utterance with a second user utterance stored in the memory, and when the comparison result indicates that a degree of matching between the first user utterance and the second user utterance is at least a threshold level, perform at least part of the task based on a sequence of states of the electronic device corresponding to the second user utterance.

According to various embodiments of the disclosure, the time required to process a voice input may thereby be reduced.

Further, a variety of effects directly or indirectly understood through this disclosure may also be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before describing an embodiment of the disclosure, an integrated intelligent system to which an embodiment of the disclosure is applied will be described.

Figure 1:
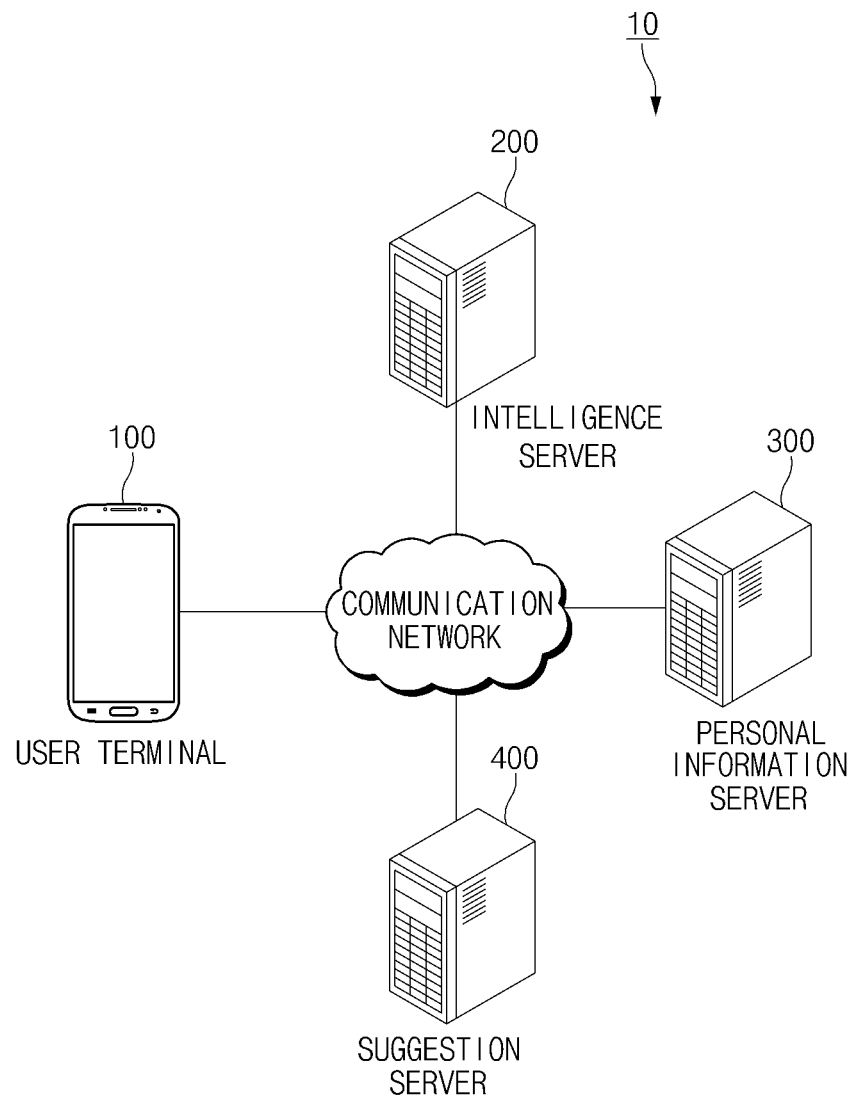
FIG. 1 is a view illustrating an integrated intelligent system, according to the related art.

FIG. 1 is a view illustrating an integrated intelligent system, according to various embodiments of the disclosure.

Referring to FIG. 1, an integrated intelligent system 10 may include a user terminal 100, an intelligence server 200, a personal information server 300, or a suggestion server 400.

The user terminal 100 may provide a service necessary for a user through an application program (app) (e.g., an alarm app, a message app, a picture (gallery) app, or the like) stored in the user terminal 100. For example, the user terminal 100 may execute and operate other app through an intelligence app (or a speech recognition app) stored in the user terminal 100. A user input for launching and operating the other app through the intelligence app of the user terminal 100 may be received. For example, the user input may be received through a physical button, a touch pad, a voice input, a remote input, or the like. According to an embodiment, various types of terminal devices (or an electronic device), which are connected with Internet, such as a mobile phone, a smartphone, personal digital assistant (PDA), a notebook computer, and the like may correspond to the user terminal 100.

According to an embodiment, the user terminal 100 may receive user utterance as a user input. The user terminal 100 may receive the user utterance and may generate an instruction for operating an app based on the user utterance. As such, the user terminal 100 may operate the app by using the instruction.

The intelligence server 200 may receive a voice input of a user from the user terminal 100 over a communication network and may change the voice input to text data. In another embodiment, the intelligence server 200 may generate (or select) a path rule based on the text data. The path rule may include information about an action (or an operation or a task) for performing the function of an app or information about a parameter necessary to perform the action. In addition, the path rule may include the order of the action of the app. The user terminal 100 may receive the path rule, may select an app depending on the path rule, and may execute an action included in the path rule in the selected app.

Generally, the term "path rule" of the disclosure may indicate, but is not limited to, a sequence of states in which an electronic device performs the task requested by the user. In other words, the path rule may include information about the sequence of the states. For example, the task may be a certain action that the intelligence app provides. The task may include the generation of a schedule, the transmission of a picture to a desired opponent, or the provision of weather information. The user terminal 100 may perform the task by sequentially having at least one or more states (e.g., an operating state of the user terminal 100).

According to an embodiment, the path rule may be provided or generated by an artificial intelligence (AI) system. The AI system may be a rule-based system, or may be a neural network-based system (e.g., a feedforward neural network (FNN) or a recurrent neural network (RNN)). Alternatively, the AI system may be a combination of the above-described systems or an AI system different from the above-described system. According to an embodiment, the path rule may be selected from a set of predefined path rules or may be generated in real time in response to a user request. For example, the AI system may select at least a path rule of predefined plurality of path rules, or may generate a path rule dynamically (or in real time). Furthermore, the user terminal 100 may use a hybrid system to provide the path rule.

For example, the user terminal 100 may execute the action and may display a screen corresponding to a state of the user terminal 100, which executes the action, in a display. According to another embodiment, the user terminal 100 may execute the action and may not display the result obtained by executing the action in the display. For example, the user terminal 100 may execute a plurality of actions and may display only the result of a part of the plurality of actions in the display. For example, the user terminal 100 may display only the result, which is obtained by executing the last action, in the display. For another example, the user terminal 100 may receive the user input to display the result obtained by executing the action in the display.

The personal information server 300 may include a database in which user information is stored. For example, the personal information server 300 may receive the user information (e.g., context information, information about execution of an app, or the like) from the user terminal 100 and may store the user information in the database. The intelligence server 200 may be used to receive the user information from the personal information server 300 over the communication network and to generate a path rule associated with the user input. According to an embodiment, the user terminal 100 may receive the user information from the personal information server 300 over the communication network, and may use the user information as information for managing the database.

The suggestion server 400 may include a database storing information about a function in a terminal, introduction of an application, or a function to be provided. For example, the suggestion server 400 may include a database associated with a function that a user utilizes by receiving the user information of the user terminal 100 from the personal information server 300. The user terminal 100 may receive information about the function to be provided from the suggestion server 400 over the communication network and may provide the information to the user.

Figure 2:
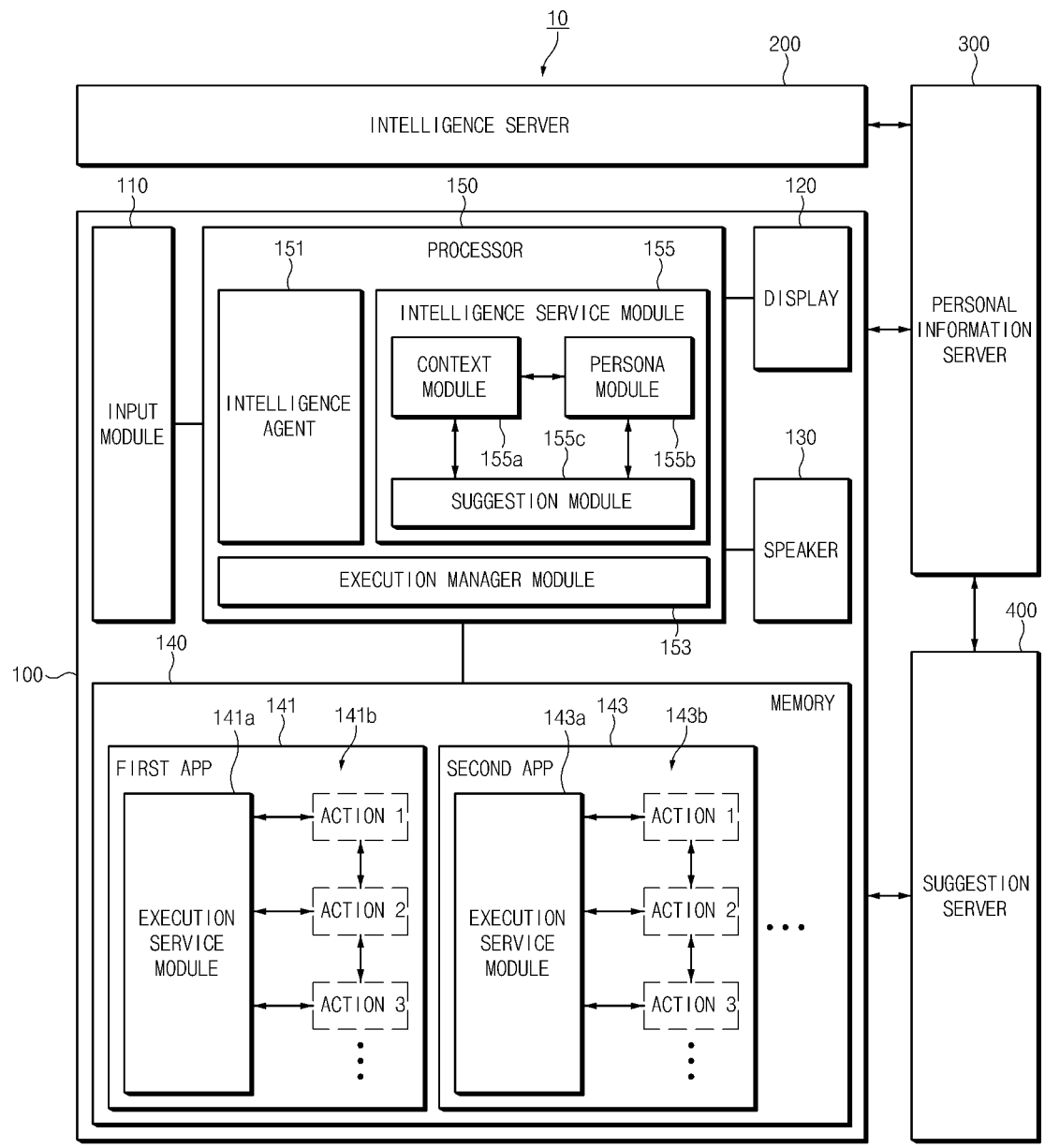
FIG. 2 is a block diagram illustrating a user terminal of an integrated intelligent system, according to an embodiment of the disclosure.

FIG. 2 is a block diagram illustrating a user terminal of an integrated intelligent system, according to an embodiment of the disclosure.

Referring to FIG. 2, the user terminal 100 may include an input module 110, a display 120, a speaker 130, a memory 140, or a processor 150. The user terminal 100 may further include a housing, and elements of the user terminal 100 may be seated in the housing or may be positioned on the housing.

According to an embodiment, the input module 110 may receive a user input from a user. For example, the input module 110 may receive the user input from the connected external device (e.g., a keyboard or a headset). For another example, the input module 110 may include a touch screen (e.g., a touch screen display) coupled to the display 120. For another example, the input module 110 may include a hardware key (or a physical key) placed in the user terminal 100 (or the housing of the user terminal 100).

According to an embodiment, the input module 110 may include a microphone that is capable of receiving user utterance as a voice signal. For example, the input module 110 may include a speech input system and may receive the utterance of the user as a voice signal through the speech input system.

According to an embodiment, the display 120 may display an image, a video, and/or an execution screen of an application. For example, the display 120 may display a graphic user interface (GUI) of an app.

According to an embodiment, the speaker 130 may output the voice signal. For example, the speaker 130 may output the voice signal generated in the user terminal 100 to the outside.

According to an embodiment, the memory 140 may store a plurality of apps 141 and 143 (or application programs). The plurality of apps 141 and 143 stored in the memory 140 may be selected, launched, and executed depending on the user input.

According to an embodiment, the memory 140 may include a database capable of storing information necessary to recognize the user input. For example, the memory 140 may include a log database capable of storing log information. For another example, the memory 140 may include a persona database capable of storing user information.

According to an embodiment, the memory 140 may store the plurality of apps 141 and 143, and the plurality of apps 141 and 143 may be loaded to operate. For example, the plurality of apps 141 and 143 stored in the memory 140 may be loaded by an execution manager module 153 of the processor 150 to operate. The plurality of apps 141 and 143 may include a plurality of execution service modules 141a and 143a. According to an embodiment, the plurality of apps 141 and 143 may execute a plurality of actions 141b and 143b (e.g., sequence of states) through the execution service modules 141a and 143a. That is, the execution service modules 141a and 143a may be activated by the execution manager module 153 and may execute the plurality of actions 141b and 143b.

According to an embodiment, when the actions 141b and 143b of the apps 141 and 143 are executed, an execution state screen according to the execution of the actions 141b and 143b may be displayed in the display 120. For example, the execution state screen may be a screen in a state where the actions 141b and 143b are completed. For another example, the execution state screen may be a screen in a state where the execution of the actions 141b and 143b is in partial landing (e.g., in the case where a parameter necessary for the actions 141b and 143b are not input).

According to an embodiment, the execution service modules 141a and 143a may execute the actions 141b and 143b depending on a path rule. For example, the execution service modules 141a and 143a may be activated by the execution manager module 153, may receive an execution request from the execution manager module 153 depending on the path rule, and may execute the actions 141b and 143b of the apps 141 and 143 depending on the execution request. When the execution of the actions 141b and 143b is completed, the execution service modules 141a and 143a may transmit completion information to the execution manager module 153.

According to an embodiment, in the case where the plurality of the actions 141b and 143b are respectively executed in the apps 141 and 143, the plurality of the actions 141b and 143b may be sequentially executed. When the execution of one action (e.g., action 1 of the first app 141 or action 1 of the second app 143) is completed, the execution service modules 141a and 143a may open the next action (e.g., action 2 of the first app 141 or action 2 of the second app 143) and may transmit completion information to the execution manager module 153. Here, it is understood that opening an arbitrary action is to change a state of the arbitrary action to an executable state or to prepare the execution of the arbitrary action. In other words, when the arbitrary action is not opened, the corresponding action may be not executed. When the completion information is received, the execution manager module 153 may transmit an execution request for the next actions 141b and 143b to an execution service (e.g., action 2). According to an embodiment, in the case where the plurality of apps 141 and 143 are executed, the plurality of apps 141 and 143 may be sequentially executed. For example, when receiving the completion information after the execution of the last action (e.g., action 3 of the first app 141) of the first app 141 is executed, the execution manager module 153 may transmit the execution request of the first action (e.g., action 1 of the second app 143) of the second app 143 to the execution service 143a.

According to an embodiment, in the case where the plurality of the actions 141b and 143b are executed in the apps 141 and 143, a result screen according to the execution of each of the executed plurality of the actions 141b and 143b may be displayed in the display 120. According to an embodiment, only a part of a plurality of result screens according to the executed plurality of the actions 141b and 143b may be displayed in the display 120.

According to an embodiment, the memory 140 may store an intelligence app (e.g., a speech recognition app) operating in conjunction with an intelligence agent 151. The app operating in conjunction with the intelligence agent 151 may receive and process the utterance of the user as a voice signal. According to an embodiment, the app operating in conjunction with the intelligence agent 151 may be operated by a specific input (e.g., an input through a hardware key, an input through a touch screen, or a specific voice input) input through the input module 110.

According to an embodiment, the processor 150 may control overall actions of the user terminal 100. For example, the processor 150 may control the input module 110 to receive the user input. The processor 150 may control the display 120 to display an image. The processor 150 may control the speaker 130 to output the voice signal. The processor 150 may control the memory 140 to read or store necessary information.

According to an embodiment, the processor 150 may include the intelligence agent 151, the execution manager module 153, or an intelligence service module 155. In an embodiment, the processor 150 may drive the intelligence agent 151, the execution manager module 153, or the intelligence service module 155 by executing instructions stored in the memory 140. Modules described in various embodiments of the disclosure may be implemented by hardware or by software. In various embodiments of the disclosure, it is understood that the action executed by the intelligence agent 151, the execution manager module 153, or the intelligence service module 155 is an action executed by the processor 150.

According to an embodiment, the intelligence agent 151 may generate an instruction for operating an app based on the voice signal received as the user input. According to an embodiment, the execution manager module 153 may receive the generated instruction from the intelligence agent 151, and may select, launch, and operate the apps 141 and 143 stored in the memory 140. According to an embodiment, the intelligence service module 155 may manage information of the user and may use the information of the user to process the user input.

The intelligence agent 151 may transmit and process the user input received through the input module 110 to the intelligence server 200.

According to an embodiment, before transmitting the user input to the intelligence server 200, the intelligence agent 151 may pre-process the user input. According to an embodiment, to pre-process the user input, the intelligence agent 151 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input to search for a part in which the user voice is present. The AGC module may adjust the volume of the user input so as to be suitable to recognize and process the user input. According to an embodiment, the intelligence agent 151 may include all the pre-processing elements for performance. However, in another embodiment, the intelligence agent 151 may include a part of the pre-processing elements to operate at low power.

According to an embodiment, the intelligence agent 151 may include a wake up recognition module recognizing a call of a user. The wake up recognition module may recognize a wake up instruction of the user through the speech recognition module. In the case where the wake up recognition module receives the wake up instruction, the wake up recognition module may activate the intelligence agent 151 to receive the user input. According to an embodiment, the wake up recognition module of the intelligence agent 151 may be implemented with a low-power processor (e.g., a processor included in an audio codec). According to an embodiment, the intelligence agent 151 may be activated depending on the user input entered through a hardware key. In the case where the intelligence agent 151 is activated, an intelligence app (e.g., a speech recognition app) operating in conjunction with the intelligence agent 151 may be executed.

According to an embodiment, the intelligence agent 151 may include a speech recognition module for performing the user input. The speech recognition module may recognize the user input for executing an action in an app. For example, the speech recognition module may recognize a limited user (voice) input (e.g., utterance such as "click" for executing a capturing action when a camera app is being executed) for executing an action such as the wake up instruction in the apps 141 and 143. For example, the speech recognition module for recognizing a user input while assisting the intelligence server 200 may recognize and rapidly process a user instruction capable of being processed in the user terminal 100. According to an embodiment, the speech recognition module for executing the user input of the intelligence agent 151 may be implemented in an app processor.

According to an embodiment, the speech recognition module (including the speech recognition module of a wake up module) of the intelligence agent 151 may recognize the user input by using an algorithm for recognizing a voice. For example, the algorithm for recognizing the voice may be at least one of a hidden Markov model (HMM) algorithm, an artificial neural network (ANN) algorithm, or a dynamic time warping (DTW) algorithm.

According to an embodiment, the intelligence agent 151 may change the voice input of the user to text data. According to an embodiment, the intelligence agent 151 may transmit the voice of the user to the intelligence server 200 to receive the changed text data. As such, the intelligence agent 151 may display the text data in the display 120.

According to an embodiment, the intelligence agent 151 may receive a path rule from the intelligence server 200. According to an embodiment, the intelligence agent 151 may transmit the path rule to the execution manager module 153.

According to an embodiment, the intelligence agent 151 may transmit the execution result log according to the path rule received from the intelligence server 200 to the intelligence service module 155, and the transmitted execution result log may be accumulated and managed in preference information of the user of a persona module 155*b*.

According to an embodiment, the execution manager module 153 may receive the path rule from the intelligence agent 151 to execute the apps 141 and 143 and may allow the apps 141 and 143 to execute the actions 141*b* and 143*b* included in the path rule. For example, the execution manager module 153 may transmit instruction information (e.g., path rule information) for executing the actions 141*b* and 143*b* to the apps 141 and 143 and may receive completion information of the actions 141*b* and 143*b* from the apps 141 and 143.

According to an embodiment, the execution manager module 153 may transmit or receive the instruction information (e.g., path rule information) for executing the actions 141*b* and 143*b* of the apps 141 and 143 between the intelligence agent 151 and the apps 141 and 143. The execution manager module 153 may bind the apps 141 and 143 to be executed depending on the path rule and may transmit the instruction information (e.g., path rule information) of the actions 141*b* and 143*b* included in the path rule to the apps 141 and 143. For example, the execution manager module 153 may sequentially transmit the actions 141*b* and 143*b* included in the path rule to the apps 141 and 143 and may sequentially execute the actions 141*b* and 143*b* of the apps 141 and 143 depending on the path rule.

According to an embodiment, the execution manager module 153 may manage execution states of the actions 141*b* and 143*b* of the apps 141 and 143. For example, the execution manager module 153 may receive information about the execution states of the actions 141*b* and 143*b* from the apps 141 and 143. For example, in the case where the execution states of the actions 141*b* and 143*b* are in partial landing (e.g., in the case where a parameter necessary for the actions 141*b* and 143*b* are not input), the execution manager module 153 may transmit information about the partial landing to the intelligence agent 151. The intelligence agent 151 may make a request for an input of necessary information (e.g., parameter information) to the user by using the received information. For another example, in the case where the execution state of the actions 141*b* and 143*b* are in an operating state, the utterance may be received from the user, and the execution manager module 153 may transmit information about the apps 141 and 143 being executed and the execution states of the apps 141 and 143 to the intelligence agent 151. The intelligence agent 151 may receive parameter information of the utterance of the user through the intelligence server 200 and may transmit the received parameter information to the execution manager module 153. The execution manager module 153 may change a parameter of each of the actions 141*b* and 143*b* to a new parameter by using the received parameter information.

According to an embodiment, the execution manager module 153 may transmit the parameter information included in the path rule to the apps 141 and 143. In the case where the plurality of apps 141 and 143 are sequentially executed depending on the path rule, the execution manager module 153 may transmit the parameter information included in the path rule from one app to another app.

According to an embodiment, the execution manager module 153 may receive a plurality of path rules. The execution manager module 153 may select a plurality of path rules based on the utterance of the user. For example, in the case where the user utterance specifies the app 141 executing a part of the action 141*b* but does not specify the app 143 executing any other action 143*b*, the execution manager module 153 may receive a plurality of different path rules in which the same app 141 (e.g., an gallery app) executing the part of the action 141*b* is executed and in which different apps 143 (e.g., a message app or a Telegram app) executing the other action 143*b*. For example, the execution manager module 153 may execute the same actions 141*b* and 143*b* (e.g., the same successive actions 141*b* and 143*b*) of the plurality of path rules. In the case where the execution manager module 153 executes the same action, the execution manager module 153 may display a state screen for selecting the different apps 141 and 143 included in the plurality of path rules in the display 120.

According to an embodiment, the intelligence service module 155 may include a context module 155*a*, a persona module 155*b*, or a suggestion module 155*c*.

The context module 155*a* may collect current states of the apps 141 and 143 from the apps 141 and 143. For example, the context module 155*a* may receive context information indicating the current states of the apps 141 and 143 to collect the current states of the apps 141 and 143.

The persona module 155*b* may manage personal information of the user utilizing the user terminal 100. For example, the persona module 155*b* may collect the usage information and the execution result of the user terminal 100 to manage personal information of the user.

The suggestion module 155c may predict the intent of the user to recommend an instruction to the user. For example, the suggestion module 155c may recommend an instruction to the user in consideration of the current state (e.g., a time, a place, context, or an app) of the user.

Figure 3:
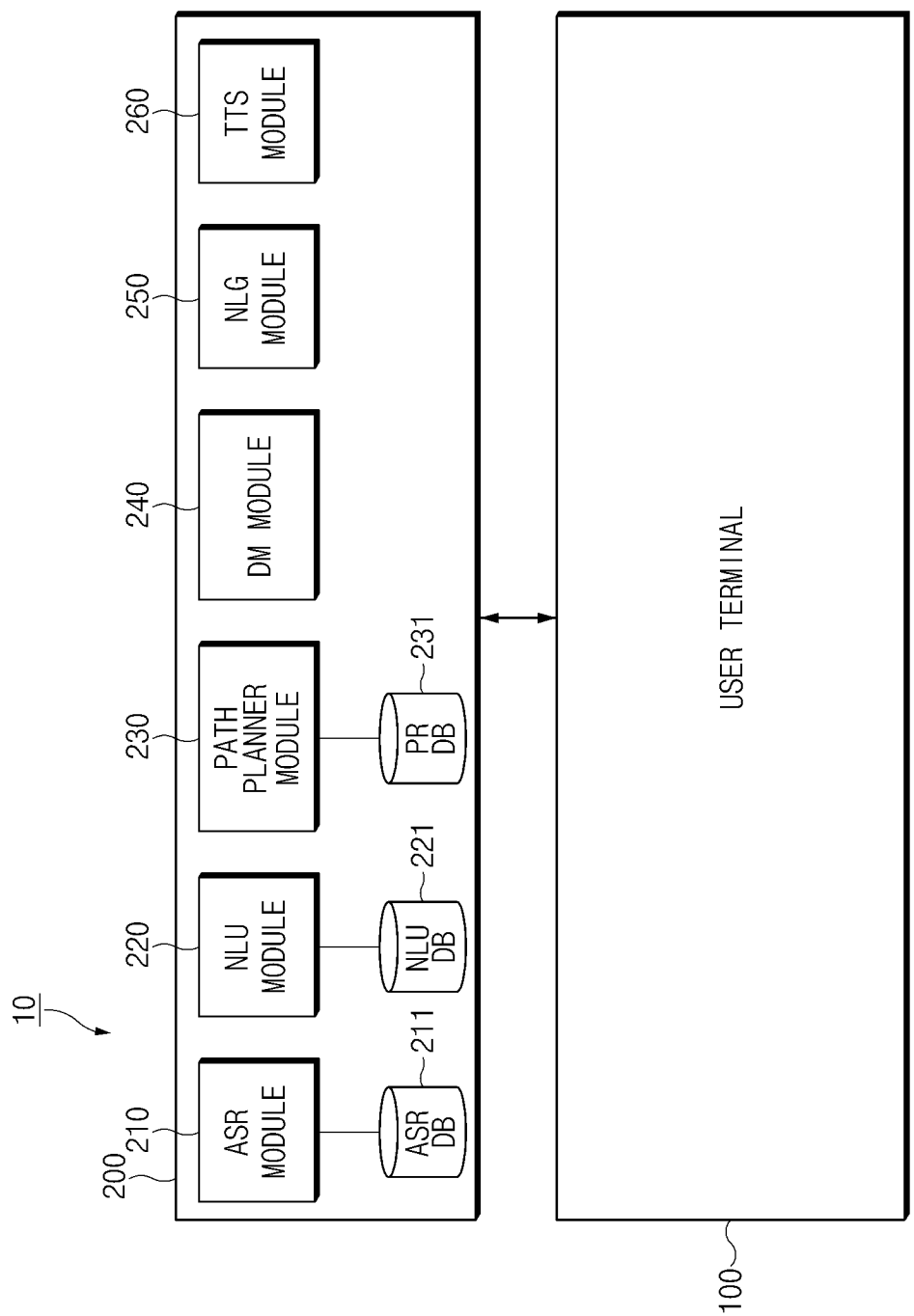
FIG. 3 is a block diagram illustrating an intelligence server of an integrated intelligent system, according to an embodiment of the disclosure.

FIG. 3 is a block diagram illustrating an intelligence server of an integrated intelligent system, according to an embodiment of the disclosure.

Referring to FIG. 3, the intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260.

The NLU module 220 or the path planner module 230 of the intelligence server 200 may generate a path rule.

According to an embodiment, the ASR module 210 may change the user input received from the user terminal 100 to text data.

For example, the ASR module 210 may include an utterance recognition module. The utterance recognition module may include an acoustic model and a language model. For example, the acoustic model may include information associated with utterance, and the language model may include unit phoneme information and information about a combination of unit phoneme information. The utterance recognition module may change user utterance to text data by using the information associated with utterance and unit phoneme information. For example, the information about the acoustic model and the language model may be stored in an automatic speech recognition database (ASR DB) 211.

According to an embodiment, the NLU module 220 may grasp user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, or the like. As such, the NLU module 220 may obtain a domain, intent, or a parameter (or a slot) necessary for the user input to express the intent.

According to an embodiment, the NLU module 220 may determine the intent of the user and parameter by using a matching rule that is divided into a domain, intent, and a parameter (or a slot) necessary to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to an embodiment, the NLU module 220 may grasp the meaning of words extracted from a user input by using linguistic features (e.g., grammatical elements) such as morphemes, phrases, and the like and may match the meaning of the grasped words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input by using the words that are the basis for grasping the intent. According to an embodiment, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to an embodiment, the path rule generated by the NLU module 220 may include information about the app to be executed, the action (e.g., at least one or more states) to be executed in the app, and a parameter necessary to execute the action.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set for the purpose of determining the path rule.

According to another embodiment, the NLU module 220 may determine the app to be executed, the action to be executed in the app, and a parameter necessary to execute the action based on the intent of the user input and the parameter for the purpose of generating one path rule or a plurality of path rules. For example, the NLU module 220 may arrange the app to be executed and the action to be executed in the app by using information of the user terminal 100 depending on the intent of the user input in the form of ontology or a graph model for the purpose of generating the path rule. For example, the generated path rule may be stored in a path rule database (PR DB) 231 through the path planner module 230. The generated path rule may be added to a path rule set of the PR DB 231.

According to an embodiment, the NLU module 220 may select at least one path rule of the generated plurality of path rules. For example, the NLU module 220 may select an optimal path rule of the plurality of path rules. For another example, in the case where only a part of action is specified based on the user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 in response to a request for the user input. For example, the NLU module 220 may transmit one path rule corresponding to the user input to the user terminal 100. For another example, the NLU module 220 may transmit the plurality of path rules corresponding to the user input to the user terminal 100. For example, in the case where only a part of action is specified based on the user utterance, the plurality of path rules may be generated by the NLU module 220.

According to an embodiment, the path planner module 230 may select at least one path rule of the plurality of path rules.

According to an embodiment, the path planner module 230 may transmit a path rule set including the plurality of path rules to the NLU module 220. The plurality of path rules of the path rule set may be stored in the PR DB 231 connected to the path planner module 230 in the table form. For example, the path planner module 230 may transmit a path rule set corresponding to information (e.g., OS information or app information) of the user terminal 100, which is received from the intelligence agent 151, to the NLU module 220. For example, a table stored in the PR DB 231 may be stored for each domain or for each version of the domain.

According to an embodiment, the path planner module 230 may select one path rule or the plurality of path rules from the path rule set to transmit the selected one path rule or the selected plurality of path rules to the NLU module 220. For example, the path planner module 230 may match the user intent and the parameter to the path rule set corresponding to the user terminal 100 to select one path rule or a plurality of path rules and may transmit the selected one path rule or the selected plurality of path rules to the NLU module 220.

According to an embodiment, the path planner module 230 may generate the one path rule or the plurality of path rules by using the user intent and the parameter. For example, the path planner module 230 may determine the app to be executed and the action to be executed in the app based on the user intent and the parameter for the purpose of generating the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user intent grasped by the NLU module 220 is clear. For example, the DM module 240 may determine whether the user intent is clear, based on whether the information of a parameter is sufficient. The DM module 240 may determine whether the parameter grasped by the NLU module 220 is sufficient to perform a task. According to an embodiment, in the case where the user intent is not clear, the DM module 240 may perform a feedback for making a request for necessary information to the user. For example, the DM module 240 may perform a feedback for making a request for information about the parameter for grasping the user intent.

According to an embodiment, the DM module 240 may include a content provider module. In the case where the content provider module executes an action based on the intent and the parameter grasped by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the natural language generating module NLG 250 may change specified information to a text form. Information changed to the text form may be a form of a natural language utterance. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130.

According to an embodiment, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a path rule) corresponding to the determined user intent and parameter. As such, the generated response may be transmitted to the user terminal 100.

Figure 4:
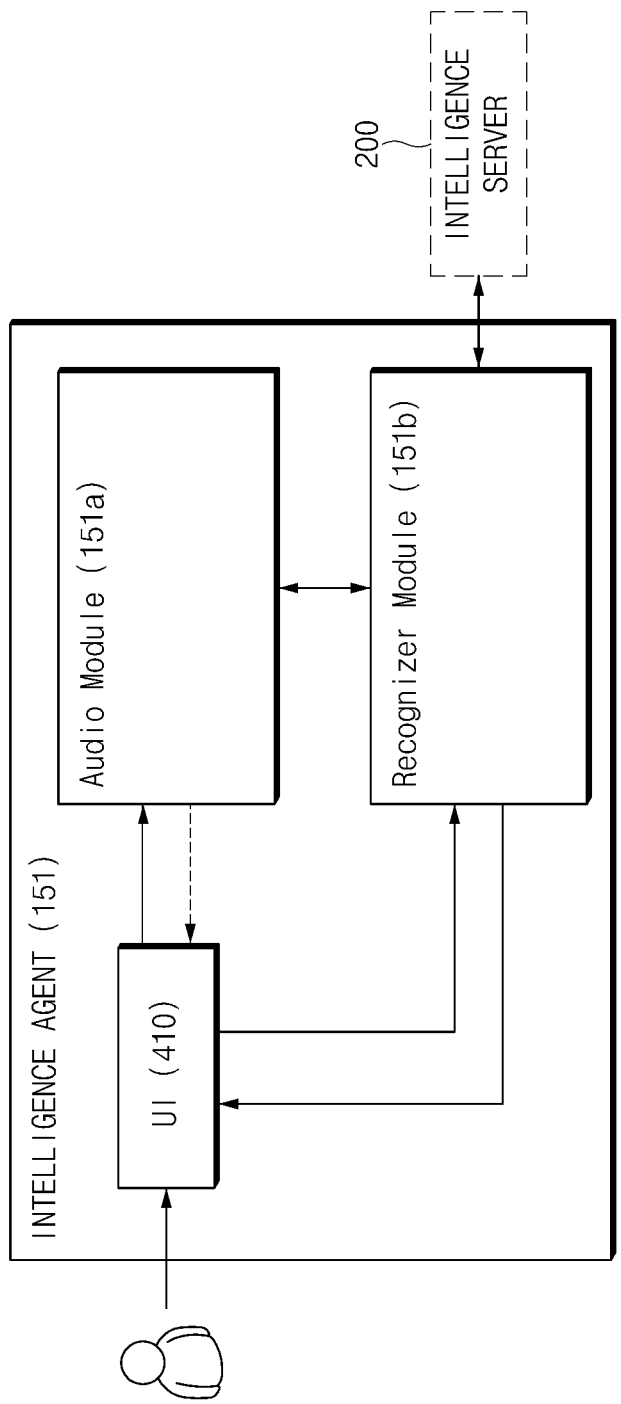
FIG. 4 is a block diagram of an intelligence agent, according to an embodiment of the disclosure.

FIG. 4 is a block diagram of an intelligence agent, according to an embodiment of the disclosure.

Referring to FIG. 4, the intelligence agent 151 may include a user interface (UI) 410, an audio module 151a, and a recognizer module 151b.

For the purpose of receiving a user utterance, the intelligence agent 151 may execute the UI 410. The UI 410 may be output through a display. For example, the UI 410 may be executed when a hardware key provided on the side surface of the user terminal 100 is pressed. When a user speaks in a state where the UI 410 is executed, the UI 410 may receive the user utterance through the microphone.

The audio module 151a may record the user utterance received through the UI 410. According to an embodiment, the audio module 151a may transmit the recorded user utterance back to the UI 410 or may transmit the recorded user utterance to the recognizer module 151b.

The recognizer module 151b may transmit the user utterance to the intelligence server 200. For example, the recognizer module 151b may receive the user utterance from the UI 410 and may transmit the user utterance to the intelligence server 200. For another example, the recognizer module 151b may transmit the user utterance, which is recorded in the audio module 151a, to the intelligence server 200.

In this disclosure, a description given with reference to FIGS. 1 to 4 may be identically applied to elements that have the same reference marks as the user terminal 100, the intelligence server 200, the personal information server 300, and the suggestion server 400 illustrated with reference to FIGS. 1 to 4.

Figure 5:
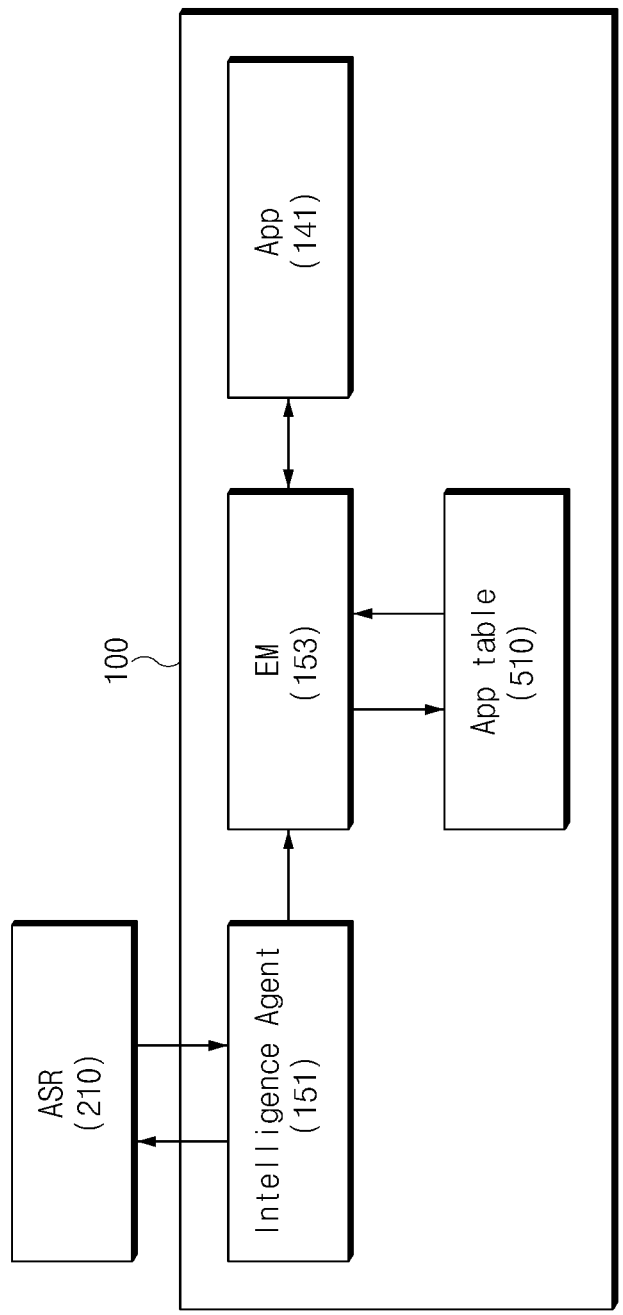
FIG. 5 illustrates a block diagram of an automatic speech recognition (ASR) module and a user terminal, according to an embodiment of the disclosure.

FIG. 5 illustrates a block diagram of an ASR module and a user terminal, according to an embodiment of the disclosure.

Referring to FIG. 5, the intelligence agent 151 may receive a user utterance. For example, the intelligence agent 151 may receive a user utterance through a microphone.

The intelligence agent 151 may transmit the user utterance, which is input through the microphone, to the ASR module 210. The ASR module 210 may convert the user utterance into text data and may transmit the text data back to the intelligence agent 151. The intelligence agent 151 may transmit the text data received from the ASR module 210, to the execution manager module 153.

According to an embodiment, the intelligence agent 151 may transmit language information together with the text data to the execution manager module 153. For example, the intelligence agent 151 may transmit, to the execution manager module 153, whether the user utterance is Korean or English.

The execution manager module 153 may identify one of the application programs (hereinafter referred to as "apps") stored in the memory based on the text data. For example, the execution manager module 153 may identify an app by comparing the text data with the text stored in an app table 510. For example, the app table 510 may be stored in the memory 140, as a table in which texts and apps are respectively mapped.

TABLE 1

| Text | Application program |
|---|---|
| Internet, Browser, Explorer, or the like | Internet app |
| Gallery, picture, video, or the like. | Gallery app |

Table 1 illustrates an app table according to an embodiment. Referring to Table 1, in the case where a user utters "search for the weather on the Internet", the execution manager module 153 may identify an "Internet app" because the user utterance includes "Internet". In addition, in the case where the user utters "find a picture in the gallery," the execution manager module 153 may identify a "gallery app" because the user utterance includes a "gallery".

According to an embodiment, the execution manager module 153 may identify an app based on language information. For example, in the case where the user utterance is "find a picture in the gallery", the app may be identified based on a word behind "in" that is the postposition. For another example, in the case where a user utterance is English, for example, the app may be identified based on a word behind "open" that is the verb.

After the app is identified, the execution manager module 153 may bind the identified app. For example, when the text data is "find a picture in the gallery", the execution manager module 153 may bind a "gallery app". In this disclosure, the binding may refer to an operation that connects the execution manager module 153 with the specific app such that the execution manager module 153 is capable of executing a specific app when a specified condition is satisfied.

According to an embodiment, the intelligence agent 151 may receive a path rule from the ASR module 210. At this time, the path rule may be a path rule generated by the intelligence server 200 based on the user utterance. When the path rule is received, the intelligence agent 151 may transmit the path rule to the execution manager module 153.

According to an embodiment, the execution manager module 153 may determine whether an app executable by the path rule is the same as the bound app. When the app executable by the path rule is the same as the bound app, the execution manager module 153 may execute the bound app. For example, when the app executable by the path rule is the same as the bound app as a "gallery app", the execution manager module 153 may execute the "gallery app".

According to an embodiment of the disclosure, it is possible to reduce the time required to perform the operation corresponding to the user utterance by binding a specific app before the path rule is received. That is, according to the comparative example, after the path rule for the user utterance is received, the app may be bound, and then the bound app may be executed, or a command based on the path rule may be transmitted to the bound app. However, according to an embodiment of the disclosure, the app may be bound before the path rule is received. As such, as soon as the path rule is received, the bound app may be executed or the command based on the path rule may be transmitted to the bound app, and thus the time required to perform the operation corresponding to the user utterance may be reduced.

Figure 6:
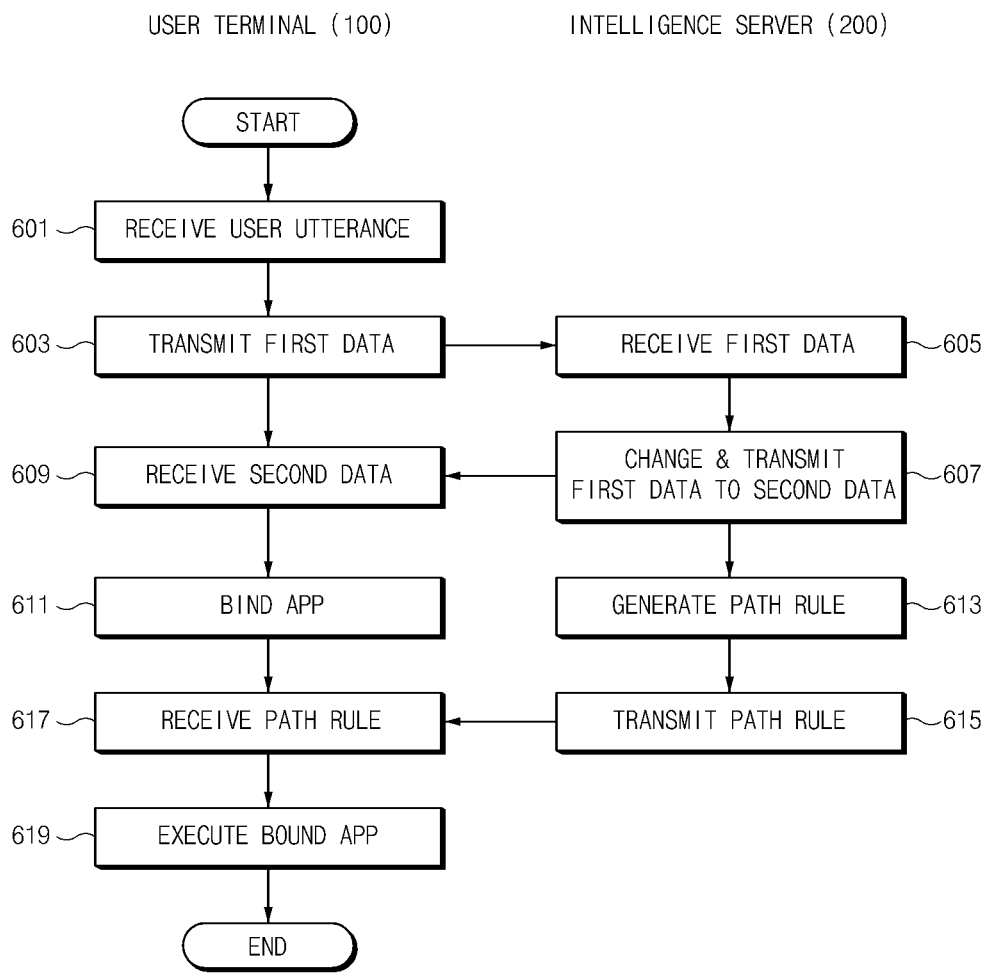
FIG. 6 illustrates an operation flowchart of a user terminal and an intelligence server, according to an embodiment of the disclosure.

FIG. 6 illustrates an operation flowchart of a user terminal and an intelligence server, according to an embodiment of the disclosure. FIG. 6 is a diagram illustrating operations performed by the user terminal 100 and the intelligence server 200 together.

Referring to FIG. 6, in operation 601, the user terminal 100 (e.g., the intelligence agent 151 of FIG. 5) may receive a user utterance (or audio signal).

In operation 603, the user terminal 100 (e.g., the intelligence agent 151 of FIG. 5) may transmit first data to the intelligence server 200 through a communication circuit. The first data may be a user utterance, or may be data associated with the user's utterance. For example, the first data may be data changed in the form capable of transmitting the user utterance to the intelligence server 200.

In operation 605, the intelligence server 200 (e.g., the ASR module 210 of FIG. 5) may receive the first data transmitted by the user terminal 100.

In operation 607, the intelligence server 200 (e.g., the ASR module 210 of FIG. 5) may change the first data to second data and then may transmit the second data to the user terminal 100. The second data may be data obtained by changing the first data in a text form. For example, when the user uttered "send a picture to Suzy by using a message," the intelligence server 200 may convert the utterance into text data and may transmit the text data to the user terminal 100.

According to an embodiment, the second data may include text data gradually being completed and whether a user utterance is terminated. For example, when a user uttered "find a Hawaii picture in the gallery and send it to Suzy by using a message", the intelligence server 200 may transmit, to the user terminal 100, the text data, which is gradually being completed, such as "in the gallery", "Hawaii in the gallery", "find a Hawaii picture in the gallery", "find a Hawaii picture in the gallery by using a message", "find a Hawaii picture in the gallery and to Suzy by using a message", "find a Hawaii picture in the gallery and send it to Suzy by using a message", or the like. At this time, the intelligence server 200 may transmit, to the user terminal 100, data together associated with whether the user utterance ends.

In operation 609, the user terminal 100 (e.g., the intelligence agent 151 of FIG. 5) may receive the second data. For example, the user terminal 100 may receive the second data from the intelligence server 200 through a communication circuit.

In operation 611, the user terminal 100 (e.g., the execution manager module 153 of FIG. 5) may bind an app based on the second data. For example, the user terminal 100 may compare the app table 510 stored in a memory with the second data and may bind the mapped app. For example, when the second data is "send a picture to Suzy by using a message" and "message" and "message app" are mapped in the app table 510, the user terminal 100 may bind a "message app".

In operation 613, the intelligence server 200 (e.g., the NLU module 220 or the path planner module 230 of FIG. 3) may generate a path rule based on the second data. For example, when the second data is "send a picture to Suzy by using a message," the intelligence server 200 may generate a path rule capable of executing a "message app". An embodiment is exemplified in FIG. 6 as operation 613 is performed after operation 611. However, embodiments of the disclosure may not be limited thereto. For example, operation 611 and operation 613 may be performed at the same time.

In operation 615, the intelligence server 200 may transmit the generated path rule to the user terminal 100.

In operation 617, the user terminal 100 (e.g., the intelligence agent 151 of FIG. 5) may receive the path rule from the intelligence server 200. For example, the user terminal 100 may receive a path rule through a communication circuit.

In operation 619, the user terminal 100 (e.g., the execution manager module 153 of FIG. 5) may compare an app executable by the path rule with the bound app. When the app executable by the path rule is the same as the bound app, the user terminal 100 may execute the bound app. For example, when the bound app is a "message app" and the app executable by the path rule is a "message app", the user terminal 100 may execute a "message app".

Figure 7:
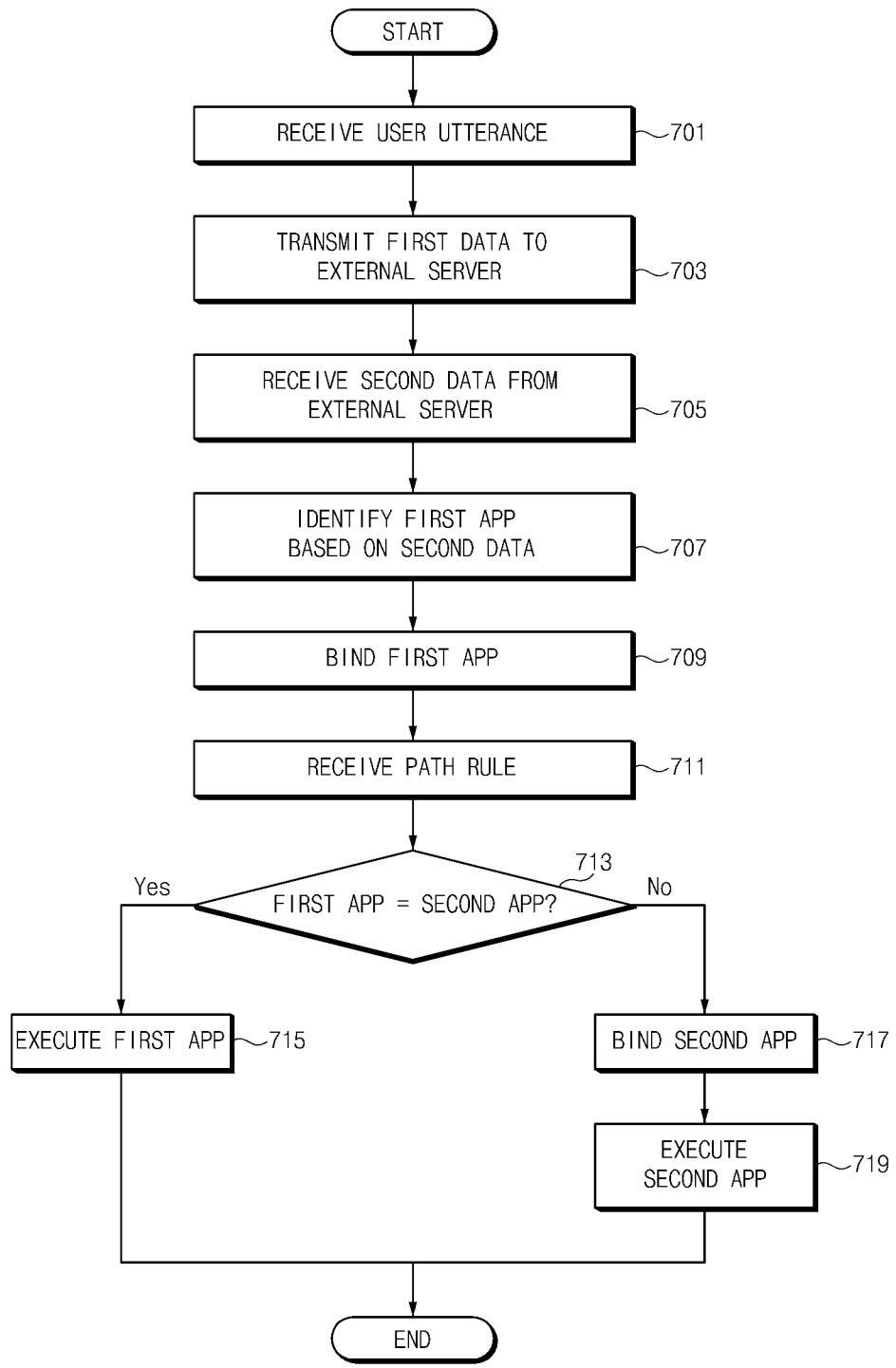
FIG. 7 illustrates an operation flowchart of a user terminal, according to an embodiment of the disclosure.

FIG. 7 illustrates an operation flowchart of a user terminal, according to an embodiment of the disclosure. FIG. 7 is a diagram illustrating operations performed by the user terminal 100.

Referring to FIG. 7, in operation 701, the user terminal 100 (e.g., the intelligence agent 151 of FIG. 5) may receive a user utterance. For example, the intelligence agent 151 may be executed when a user presses a hardware key provided on the side surface of the user terminal 100. When a user speaks in a state where the intelligence agent 151 is executed, the intelligence agent 151 may receive the user utterance through a microphone.

In operation 703, the user terminal 100 (e.g., the intelligence agent 151 of FIG. 5) may transmit first data to an external server. The first data may be data associated with the user's utterance, for example, data changed in the form capable of transmitting the user's utterance to the external server. The external server may be at least one of the intelligence server 200, the personal information server 300, and the suggestion server 400 shown in FIG. 1.

In operation 705, the user terminal 100 (e.g., the intelligence agent 151 of FIG. 5) may receive second data from the external server. The second data may be data including a text generated by the external server. That is, the second data may be data obtained by converting the user utterance into a text format.

In operation 707, the user terminal 100 (e.g., the execution manager module 153 of FIG. 5) may identify a first app based on the at least part of the second data. For example, the user terminal 100 may compare the second data with the app table 510 to identify the first app. For example, the app table 510 may be stored in a memory, as data obtained by mapping a text to an app. That is, in the case where the second data is "find a Hawaii picture in a gallery" and "gallery" and "gallery app" are mapped in the table, the user terminal 100 may identify the "gallery app" as the first app.

In operation 709, the user terminal 100 (e.g., the execution manager module 153 of FIG. 5) may bind the first app. That is, when a specified condition is satisfied, the user terminal 100 may allow the execution manager module 153 to execute the first app immediately.

In operation 711, the user terminal 100 (e.g., the intelligence agent 151 of FIG. 5) may receive a path rule. For example, the user terminal 100 may receive the path rule from at least one of the intelligence server 200, the personal information server 300, and the suggestion server 400.

In operation 713, the user terminal 100 (e.g., the execution manager module 153 of FIG. 5) may determine whether the first app is the same as the second app. The second app may mean an app executable based on the path rule received in operation 711.

When the first app is the same as the second app, the user terminal 100 (e.g., the execution manager module 153 of FIG. 5) may execute the first app in operation 715. For example, in the state where the "gallery app" is set to the first app, in the case where the app executable based on the path rule is also the "gallery app", the user terminal 100 may execute the "gallery app".

When the first app is not the same as the second app, the user terminal 100 (e.g., the execution manager module 153 of FIG. 5) may bind the second app in operation 717. When the second app is bound, in operation 719, the user terminal 100 (e.g., the execution manager module 153 of FIG. 5) may execute the second app. For example, in the case where the app executable based on the path rule is a "message app" in the state where the "gallery app" is set to the first app, the user terminal 100 may bind a "message app". When the "message app" is bound, the user terminal 100 may execute a "message app" or may transmit a command based on the path rule received by the "message app".

Figure 8:
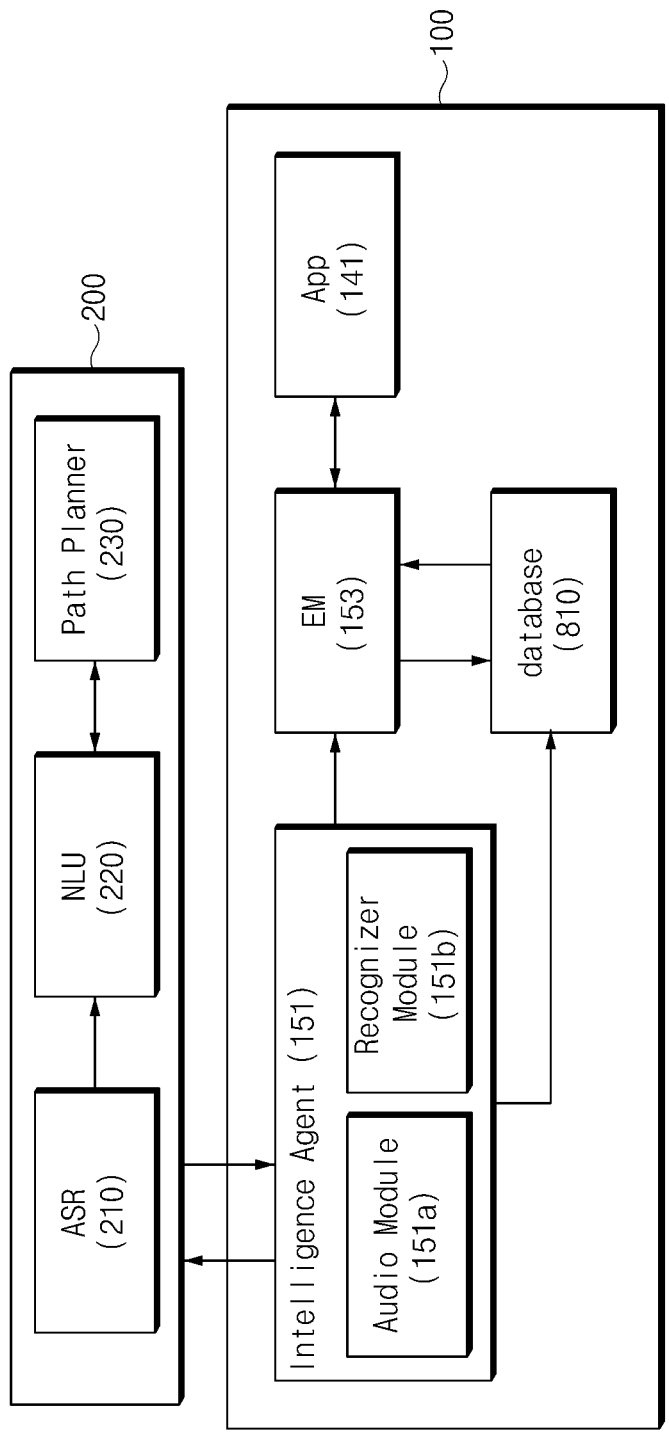
FIG. 8 illustrates a block diagram of a user terminal and an intelligence server, according to an embodiment of the disclosure.

FIG. 8 illustrates a block diagram of a user terminal and an intelligence server, according to an embodiment of the disclosure. FIG. 8 illustrates a process to store various pieces of data before an app is executed.

Referring to FIG. 8, after receiving a user utterance, the intelligence agent 151 may transmit the user utterance to the ASR module 210. After changing the user utterance into text data, the ASR module 210 may transmit the text data back to the intelligence agent 151.

According to an embodiment, the intelligence agent 151 may store voice data, text data, and context information in a database 810. The voice data may be pulse code modulation (PCM) data associated with the user utterance. The context information may be information about the state of an electronic device, and, for example, may include the type of an app being executed in an electronic device, The NLU module 220 and/or the path planner module 230 may generate a path rule based on the text data. The path rule generated by the NLU module 220 and/or the path planner module 230 may be transmitted to the ASR module 210. The ASR module 210 may transmit the path rule back to the intelligence agent 151.

According to an embodiment, the intelligence agent 151 may transmit the path rule to the execution manager module 153. The execution manager module 153 may execute an app corresponding to the path rule based on the path rule. In the case where the user terminal 100 succeeds in executing the app, the execution manager module 153 may associate the path rule, the executed app, and the voice data with each other to store the path rule, the executed app, and the voice data in a database.

Figure 9:
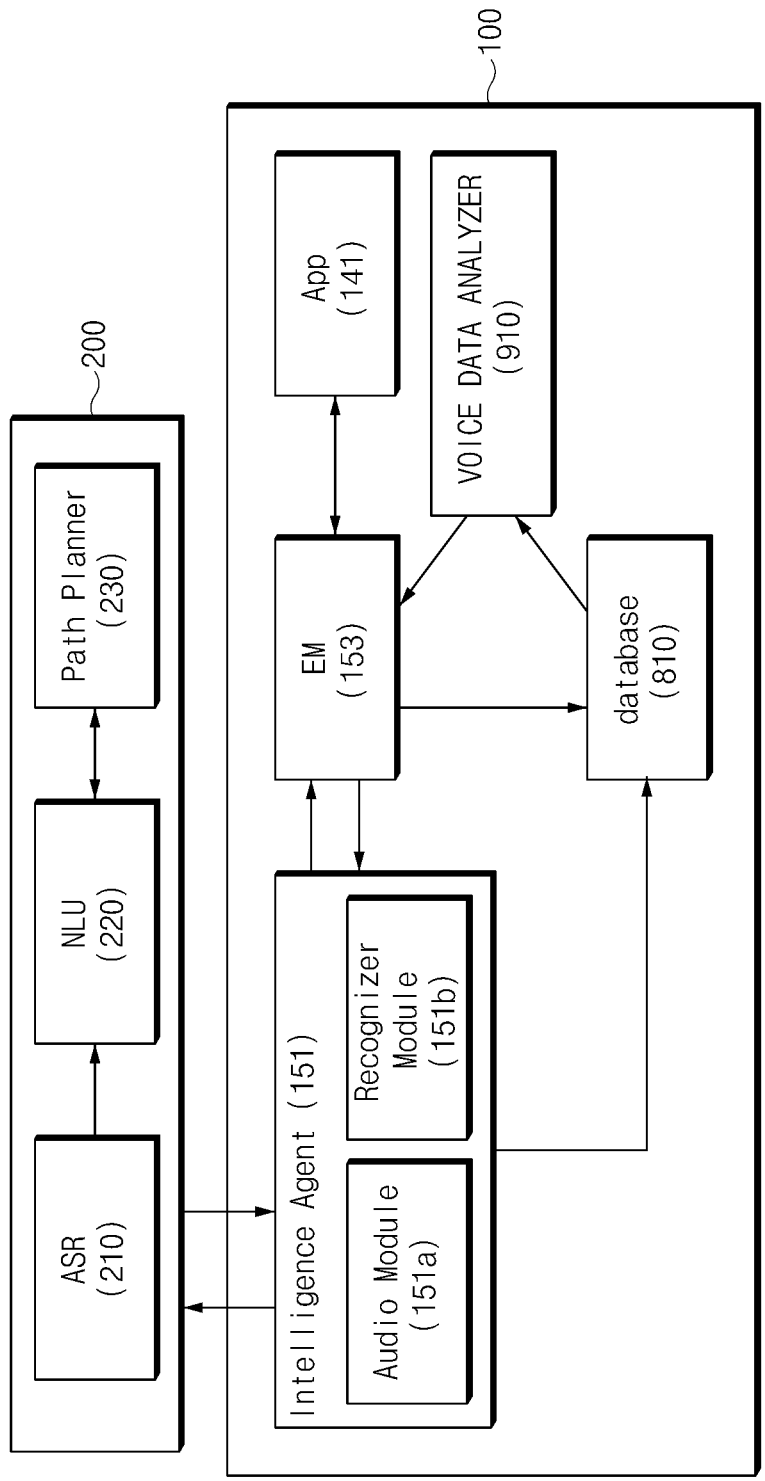
FIG. 9 illustrates a block diagram of a user terminal and an intelligence server, according to an embodiment of the disclosure.

FIG. 9 illustrates a block diagram of a user terminal and an intelligence server, according to an embodiment of the disclosure. FIG. 9 illustrates a process to execute an app by using various pieces of data stored in FIG. 8.

Referring to FIG. 9, the intelligence agent 151 may receive a user utterance. After receiving the user utterance, the intelligence agent 151 may transmit voice data to the execution manager module 153.

A voice data analyzer 910 may compare the voice data transmitted to the execution manager module 153 with the voice data stored in the database. When the comparison result indicates that the transmitted voice data is the same as the stored voice data, the execution manager module 153 may determine a path rule corresponding to the stored voice data and may transmit the ID of the determined path rule to the intelligence agent 151.

The intelligence agent 151 may transmit the ID of the determined path rule to the intelligence server 200 to determine whether the determined path rule is refined. In the case where the determined path rule is not refined, the intelligence agent 151 may transmit, to the execution manager module 153, data indicating that the path rule is not refined. The execution manager module 153 may execute the app based on the determined path rule.

For example, the database 810 may store voice data of "find a picture in the gallery" and a path rule capable of executing a "gallery app". At this time, when the user utters "find a picture in a gallery", the user terminal 100 may determine whether the path rule capable of executing the "gallery app" is refined. When the path rule is not refined, the user terminal 100 may execute the "gallery app".

Figure 10:
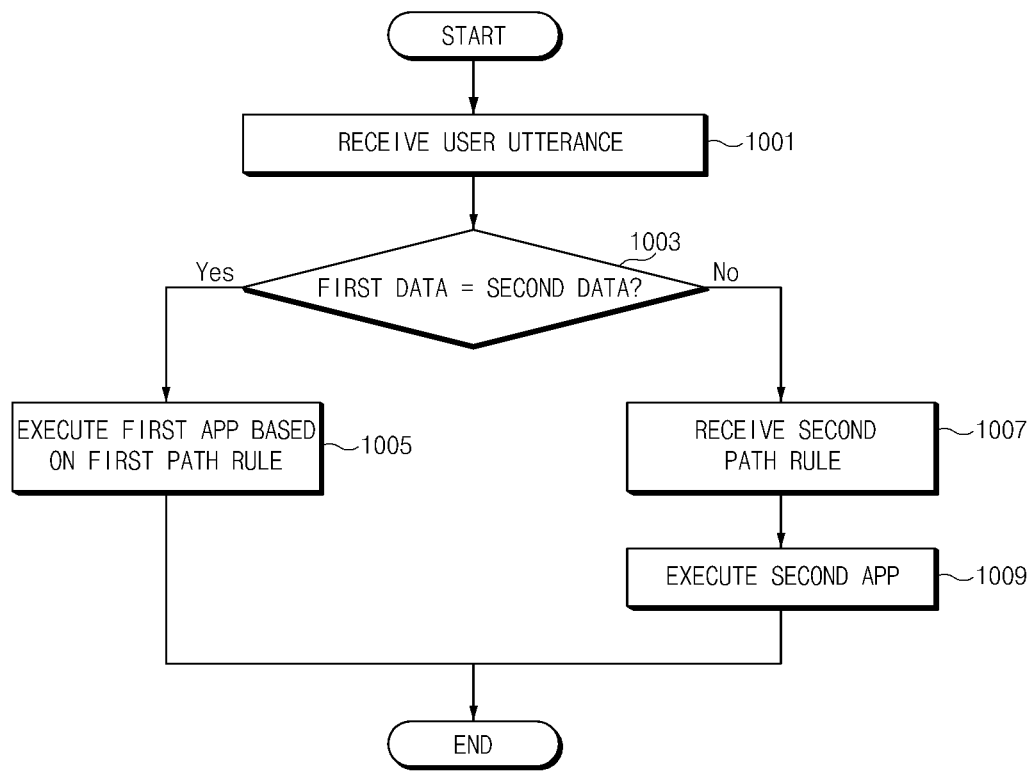
FIG. 10 illustrates an operation flowchart of a user terminal, according to an embodiment of the disclosure.

FIG. 10 illustrates an operation flowchart of a user terminal, according to an embodiment of the disclosure.

Referring to FIG. 10, in operation 1001, the user terminal 100 (e.g., the intelligence agent 151 of FIG. 9) may receive a user utterance. For example, the user terminal 100 may receive a user utterance saying that "find a picture in a gallery".

In operation 1003, the user terminal 100 (e.g., voice data analyzer 910 of FIG. 9) may determine whether first data is the same as second data. The first data may be voice data stored in a database, and the second data may be voice data received through a microphone.

When the first data is the same as the second data, in operation 1005, the user terminal 100 (e.g., the execution manager module 153 of FIG. 9) may execute a first app based on a first path rule. The first path rule and the first app may be stored in the database, as a path rule and an app associated with the first data. For example, when the first data and the second data are the same as "find a picture in a gallery", the user terminal 100 may execute a "gallery app".

When the first data and the second data are not the same as each other, in operation 1007, the user terminal 100 (e.g., the intelligence agent 151 of FIG. 9) may receive a second path rule from the intelligence server 200. The second path rule may be a path rule newly generated by the intelligence server 200, as a path rule associated with the second data.

In operation 1009, the user terminal 100 (e.g., the execution manager module 153 of FIG. 9) may execute the second app based on the second path rule. The second app may be an app associated with the second path rule. For example, when the first data is "find a picture in a gallery" and the second data is "send a picture by using a message", the user terminal 100 may receive a path rule capable of executing a "message app". Next, the user terminal 100 may bind the "message app" and may execute the "message app" or may transmit a command based on a path rule received by the "message app".

Figure 11:
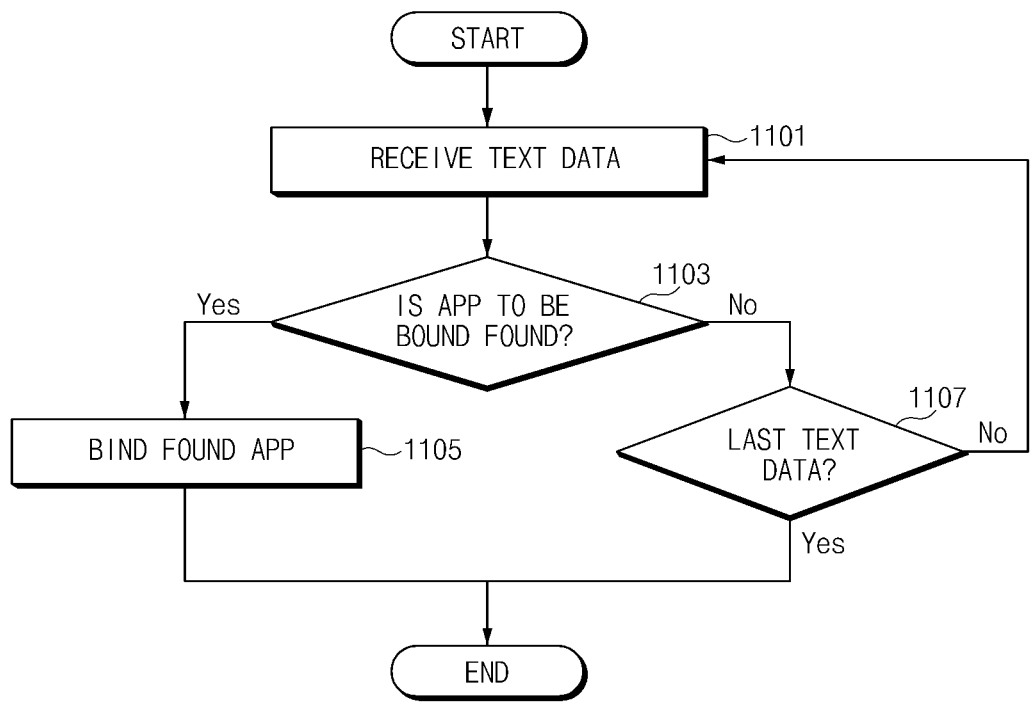
FIG. 11 illustrates an operation flowchart of a user terminal, according to an embodiment of the disclosure.

FIG. 11 illustrates an operation flowchart of a user terminal, according to an embodiment of the disclosure. FIG. 11 illustrates the operation flowchart of the user terminal 100 in the case where an app to be bound is found and in the case where an app to be bound is not found.

Referring to FIG. 11, in operation 1101, the user terminal 100 (e.g., the intelligence agent 151 of FIG. 5) may receive text data. For example, the user terminal 100 may continuously receive text data from the ASR module 210.

In operation 1103, the user terminal 100 (e.g., the execution manager module 153 of FIG. 5) may search for an app corresponding to the text data. For example, when the text data is "find a picture in a gallery", the user terminal 100 may search for a "gallery app".

When an app corresponding to the text data is found, in operation 1105, the user terminal 100 (e.g., the execution manager module 153 of FIG. 5) may bind the found app. In the embodiment, when the "gallery app" is found, the user terminal 100 may bind the "gallery app".

When an app corresponding to the text data is not found, in operation 1107, the user terminal 100 (e.g., the execution manager module 153 of FIG. 5) may determine whether the text data is the last text data that the user terminal 100 is capable of receiving. When the text data is not the last text data, the user terminal 100 (e.g., the intelligence agent 151 of FIG. 5) may receive another text data. When the text data is the last text data, the user terminal 100 (e.g., the execution manager module 153 of FIG. 5) may determine that there is no app to be bound and may terminate an app binding procedure.

Figure 12:
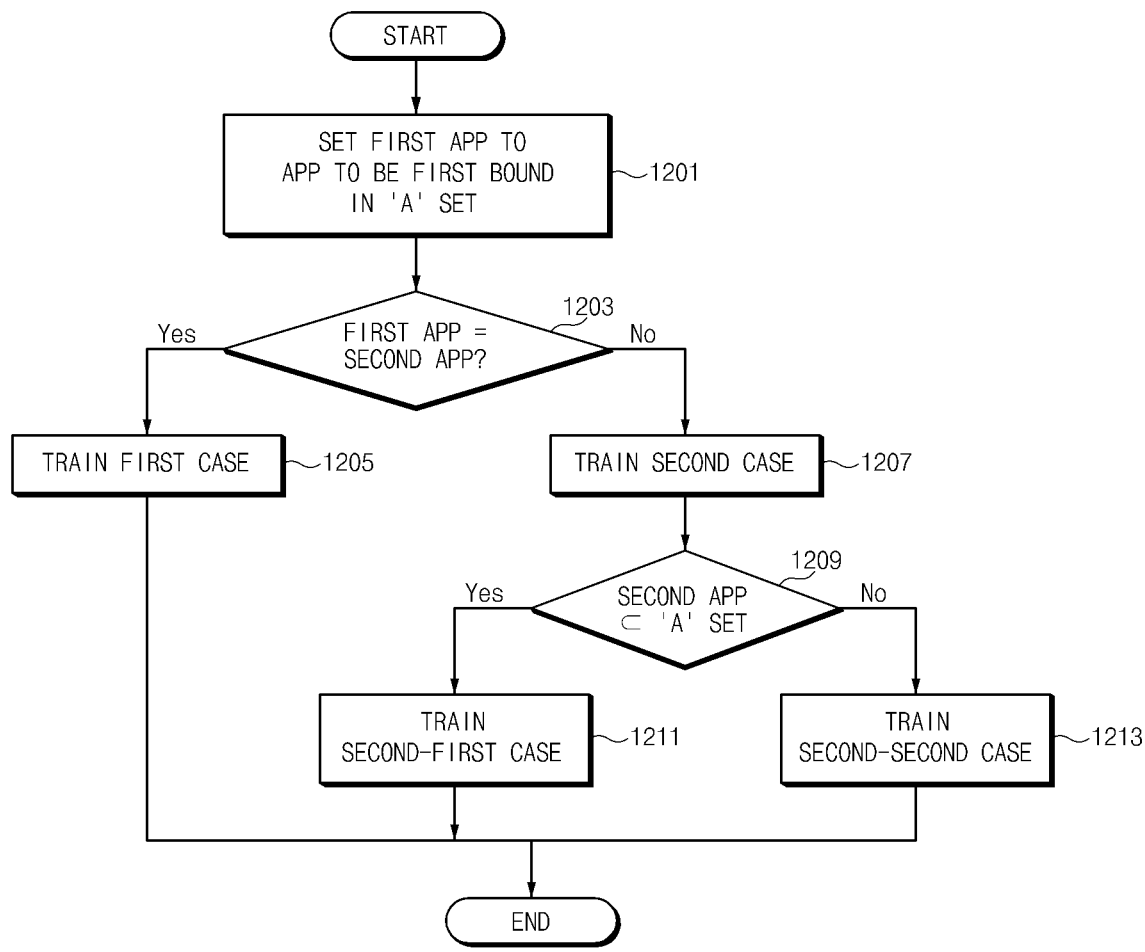
FIG. 12 illustrates an operation flowchart of a user terminal, according to an embodiment of the disclosure.

FIG. 12 illustrates an operation flowchart of a user terminal, according to an embodiment of the disclosure. FIG. 12 illustrates the operation flowchart of the user terminal 100 that trains an app binding result.

Referring to FIG. 12, in operation 1201, the user terminal 100 (e.g., the execution manager module 153 of FIG. 5) may set the first app to an app to be first bound in 'A' set. 'A' set may mean a set of application programs. For example, when the text data received from the ASR module 210 is "find a picture in a gallery and send it by using a message", the app that the user terminal 100 needs to bind may be a "gallery app" and a "message app". In this case, the user terminal 100 may set the "gallery app" as the first app to be bound first. The "gallery app" and the "message app" may be included in 'A' set.

In operation 1203, the user terminal 100 (e.g., the execution manager module 153 of FIG. 5) may determine whether the first app is the same as the second app. The second app may be an app actually bound by the user terminal 100.

When the first app is the same as the second app, in operation 1205, the user terminal 100 (e.g., the execution manager module 153 of FIG. 5) may train a first case. The first case may mean the case where the app to be bound is the same as the actually bound app. The trained result may be transmitted to an external server or an external device through a communication circuit.

When the first app is not the same as the second app, in operation 1207, the user terminal 100 (e.g., the execution manager module 153 of FIG. 5) may train a second case. The second case may mean the case where the app to be bound is not the same as the actually bound app.

According to an embodiment, the second case may be classified into the second-first case and the second-second case. The second-first case may be a case where the order of the bound app is wrong. For example, when the text data received from the ASR module 210 is "find a picture in a gallery and send it by using a message", even though the "gallery app" needs to be set as the first app, the second-first case may be the case where the "message app" is set to the first app. The second-second case may be the case of incorrectly binding the app. In the embodiment, the second-second case may be the case where a "weather app" is set to the first app.

In operation 1209, the user terminal 100 (e.g., the execution manager module 153 of FIG. 5) may determine whether the second app is included in 'A' set. When the second app is included in 'A' set, in operation 1211, the user terminal 100 may train the second-first case. That is, even though the app to be bound is not the same as the actually bound app, when the bound app is included in 'A' set, it may be determined that the order of the bound app is wrong.

When the second app is not included in 'A' set, in operation 1213, the user terminal 100 (e.g., the execution manager module 153 of FIG. 5) may train the second-second case. That is, when the app to be bound is not the same as the actually bound app, and the bound app is not included in 'A' set, the user terminal 100 may determine that the app is incorrectly bound.

Figure 13A:
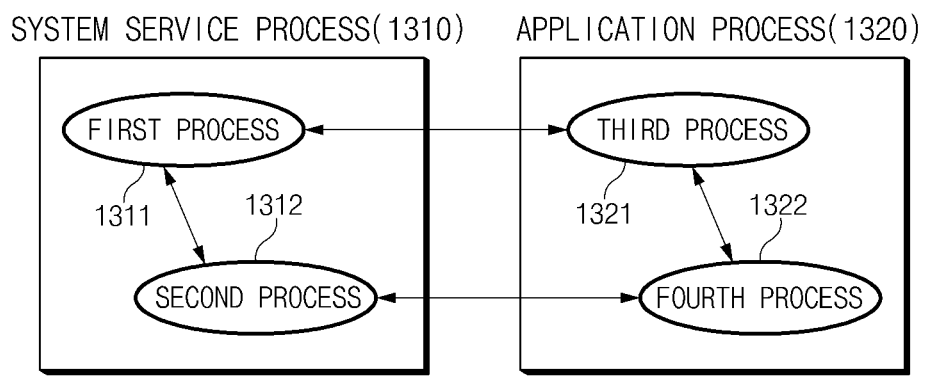
FIG. 13A illustrates a system service process and an application process, according to an embodiment of the disclosure.
Figure 13B:
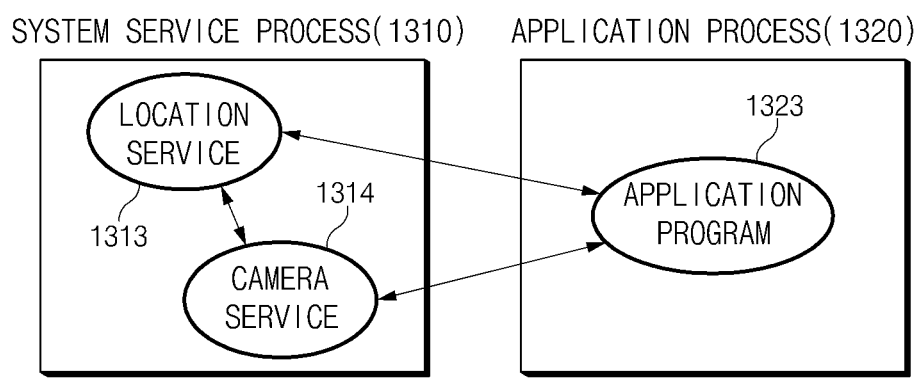
FIG. 13B illustrates a system service process and an application process, according to an embodiment of the disclosure.

FIG. 13A illustrates a system service process and an application process, according to an embodiment of the disclosure. FIG. 13B illustrates a system service process and an application process, according to an embodiment of the disclosure. FIGS. 13A and 13B illustrate views for more specifically describing the concept of binding.

Referring to FIG. 13A, the user terminal 100 may set a mechanism such that a system service process 1310 and an application process 1320 are capable of transmitting and receiving requests and responses to and from each other. For example, the mechanism may be set such that a first process 1311 and a third process 1321 transmit and receive requests and responses to and from each other and a second process 1312 and a fourth process 1322 transmit and receive requests and responses to and from each other. In this disclosure, as illustrated in FIG. 13A, the binding may mean an operation of setting the mechanism between the system service process 1310 and the application process 1320.

During the manufacture of the user terminal 100, the system service process 1310 may mean an application, a program, or the like stored or installed in the user terminal 100. The application process 1320 may mean an application, a program, or the like, which a user has directly installed or stored in the user terminal 100.

Referring to FIG. 13B, a location service 1313 and an application program 1323 may be bound and a camera service 1314 and the application program 1323 may be bound. Accordingly, when the user terminal 100 calls the application program 1323, the location service 1313 may be called together. In addition, when the user terminal 100 calls the application program 1323, the camera service 1314 may be called together.

Figure 14:
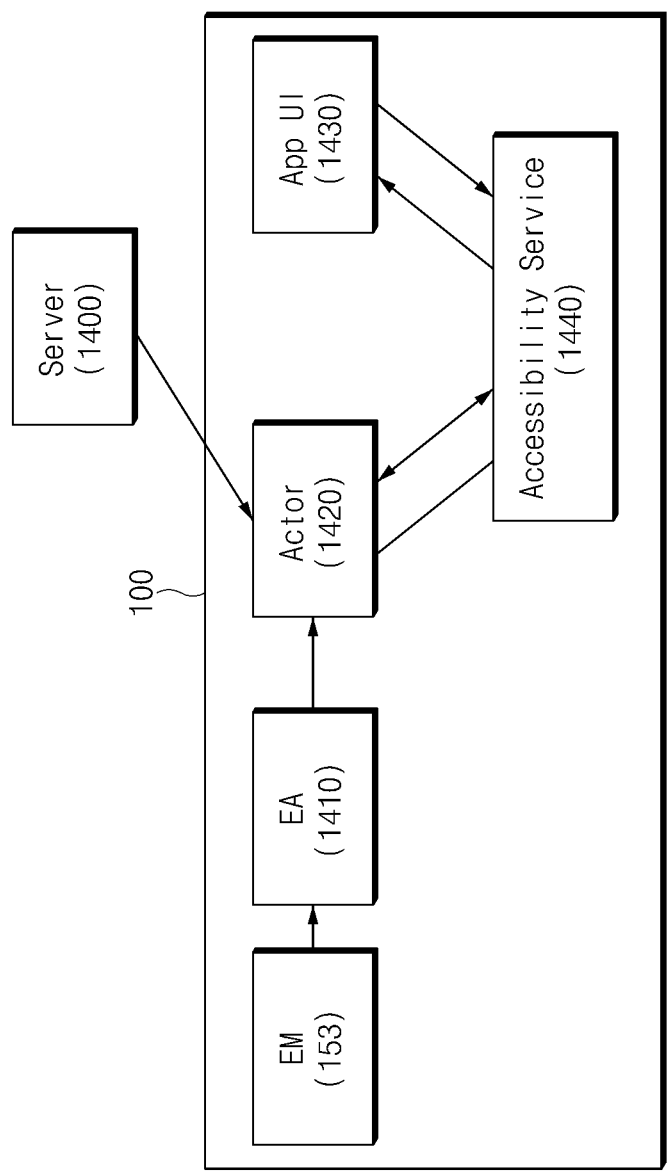
FIG. 14 illustrates a block diagram of a user terminal and an intelligence server, according to an embodiment of the disclosure.

FIG. 14 illustrates a block diagram of a user terminal and an intelligence server, according to an embodiment of the disclosure.

Referring to FIG. 14, the user terminal 100 may include the execution manager module 153, an execution agent (EA) 1410, an actor module 1420, an app UI 1430, and an accessibility service module 1440.

The execution manager module 153 may be connected to the EA 1410 and may control the EA 1410. The EA 1410 may execute an app by using actors stored in the actor module 1420 and the accessibility service module 1440. The executed app may be output through the app UI 1430.

In the disclosure, the actor may be programs that control apps based on path rules, or a set of application programming interfaces (API). For example, the user terminal 100 may store a first type application and a second type application. The first type application may be an application programmed by a producer or manufacturer the same as the producer or manufacturer of the user terminal 100. The second type application may be an application programmed by a producer or manufacturer different from the producer or manufacturer of the user terminal 100. The actor may mean a program for controlling the second type application or an API set.

According to an embodiment, the execution manager module 153 may receive actors from a server 1400. For example, when Twitter, Facebook, or the like is installed in the user terminal 100, the execution manager module 153 may determine whether the server 1400 stores actors associated with Twitter and Facebook. When the server 1400 stores the actors associated with Twitter and Facebook, the execution manager module 153 may receive the actors associated with Twitter and Facebook. For another example, the execution manager module 153 may determine whether the actors are refined or added by periodically communicating with the server 1400. When the actors is refined or added, the execution manager module 153 may receive the refined or added actors. The server 1400 may be one of the intelligence server 200, the personal information server 300, and the suggestion server 400 illustrated in FIG. 1 or may be a server storing the actors.

According to an embodiment, after the execution manager module 153 binds an app corresponding to a user utterance, the EA 1410 may load an actor corresponding to the app into a memory. For example, in the case where the user utters "attach the picture captured yesterday from Facebook", the execution manager module 153 may bind a Facebook app in advance. The EA 1410 may load an actor corresponding to the Facebook app onto the memory to control the Facebook app. While the actor is loaded onto memory, a path rule corresponding to Facebook may be transmitted to the user terminal 100. Since the actor is loaded onto the memory, the user terminal 100 may execute the Facebook app as soon as the path rule is received by the user terminal 100 or may transmit an operation execution command to the Facebook app based on the path rule.

According to an embodiment of the disclosure, an electronic device may include a housing, a speaker positioned in a first area of the housing, a microphone positioned in a second area of the housing, a display positioned in a third area of the housing, a communication circuit positioned inside the housing or attached to the housing, a processor positioned inside the housing and operatively connected to the speaker, the microphone, the display, and the communication circuit, and a memory positioned inside the housing, operatively connected to the processor, and storing a plurality of application programs and instructions. The instructions, when executed, may cause the processor to receive a first user utterance including a request for performing a task by using at least one of the application programs, through the microphone, to transmit first data associated with the first user utterance to at least one external server through the communication circuit, to receive second data including a text generated by an ASR module, from the external server through the communication circuit, to identify the at least one of the application programs based on at least part of the second data, after identifying the at least one of the application programs, to receive a first response including information associated with a sequence of states of the electronic device from the external server through the communication circuit to perform at least part of the task, and to perform the at least part of the task by allowing the electronic device to have the sequence of the states by using the at least one of the application programs.

According to an embodiment of the disclosure, the memory may store a service component associated with an intelligence assistant, and the instructions may cause the processor, before receiving the first response, to establish communication between the identified at least one of the application programs and the service component.

According to an embodiment of the disclosure, the communication may include inter process communication (IPC).

According to an embodiment of the disclosure, the instructions may include an operating system, and the instructions may cause the processor to start the communication by using binder mechanism or framework.

According to an embodiment of the disclosure, the application programs may include a first type application program and a second type application program, and the instructions may cause the processor, when the identified application program is the first type application program, to perform the at least part of the task based on the sequence; and when the identified application program is the second type application program, to perform the at least part of the task based on an actor received from the external server.

According to an embodiment of the disclosure, the instructions may cause the processor to identify the at least one of the application programs based on a category in which the first user utterance is included.

According to an embodiment of the disclosure, the instructions may cause the processor to identify the at least one of the application programs based on another portion adjacent to a specified portion of the text.

According to an embodiment of the disclosure, an electronic device may include a housing, a speaker positioned in a first area of the housing, a microphone positioned in a second area of the housing, a display positioned in a third area of the housing, a communication circuit positioned inside the housing or attached to the housing, a processor positioned inside the housing and connected to the speaker, the microphone, the display, and the communication circuit, and a memory positioned inside the housing, connected to the processor, and storing a plurality of application programs and instructions. The instructions, when executed, may cause the processor to receive a user utterance through the microphone, to transmit the user utterance to an external server through the communication circuit, to receive text data corresponding to the user utterance from the external server through the communication circuit, to identify a first application program of the application programs based on at least part of the text data, to establish communication between the first application program and a control program capable of executing the application programs, to receive a sequence of states of the electronic device from the external server, to compare the first application program and a second application program executable based on the sequence, and to execute the first application program or the second application program based on the comparison result.

According to an embodiment of the disclosure, the instructions may cause the processor, when the first application program corresponds to the second application program, to execute the first application program.

According to an embodiment of the disclosure, the instructions may cause the processor, when the first application program does not correspond to the second application program, to establish communication between the second application program and the control program.

According to an embodiment of the disclosure, the instructions may cause the processor, when the communication between the second application program and the control program is established, to execute the second application program.

According to an embodiment of the disclosure, the instructions may cause the processor to receive data indicating whether the user utterance is terminated, through the communication circuit.

According to an embodiment of the disclosure, the instructions may cause the processor to sequentially receive pieces of text data generated based on an order in which the user utterance is entered into the electronic device, through the communication circuit.

According to an embodiment of the disclosure, the text data may include identification data capable of identifying each of the application programs. The instructions may cause the processor to identify the first application program based on the identification data.

According to an embodiment of the disclosure, the instructions may cause the processor to identify at least one of the application programs based on a category in which the user utterance is included.

According to an embodiment of the disclosure, an electronic device may include a housing, a speaker positioned in a first area of the housing, a microphone positioned in a second area of the housing, a display positioned in a third area of the housing, a communication circuit positioned inside the housing or attached to the housing, a processor positioned inside the housing and connected to the speaker, the microphone, the display, and the communication circuit, and a memory positioned inside the housing, connected to the processor, and storing a plurality of application programs and instructions. the instructions, when executed, may cause the processor to receive a first user utterance including a request for performing a task by using at least one of the application programs, through the microphone by using at least one of the application programs, to compare the first user utterance with a second user utterance stored in the memory, when the comparison result indicates that a degree of matching between the first user utterance and the second user utterance is not less than a specified level, to perform at least part of the task based on a sequence of states of the electronic device corresponding to the second user utterance.

According to an embodiment of the disclosure, the instructions may cause the processor to receive data indicating whether the sequence is refined, from the external server; and, when the refinement is not made, to perform the at least part of the task based on the sequence.

According to an embodiment of the disclosure, the instructions may cause the processor, when the refinement is made, to receive the refined sequence of the states of the electronic device from the external server and to perform the at least part of the task based on the refined sequence of the states of the electronic device.

According to an embodiment of the disclosure, the first user utterance may include first PCM data corresponding to the first user utterance. The second user utterance includes second PCM data corresponding to the second user utterance, and the instructions may cause the processor to compare the first PCM data with the second PCM.

According to an embodiment of the disclosure, the instructions may cause the processor to receive text data corresponding to the first user utterance.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing;
a speaker disposed in a first area of the housing;
a microphone disposed in a second area of the housing;
a display disposed in a third area of the housing;
a communication circuit disposed inside the housing or attached to the housing;
at least one processor disposed inside the housing and operatively connected to the speaker, the microphone, the display, and the communication circuit; and
a memory disposed inside the housing, operatively connected to the at least one processor, and configured to store a plurality of application programs and instructions,
wherein the instructions, when executed, cause the at least one processor to:
receive, through the microphone, a user utterance including a request to perform a task by using at least one of the plurality of application programs,
transmit, through the communication circuit, first data associated with the user utterance to an external server,
receive, from the external server through the communication circuit, second data including a text generated by an automatic speech recognition (ASR) module,
in response to receiving the second data including the text, identify the at least one of the plurality of application programs based on at least part of the second data including the text,
prepare to execute the identified at least one of the plurality of application programs while the external server creates or determines a sequence of states of the electronic device,
after identifying the at least one of the plurality of application programs, receive, from the external server through the communication circuit, a first response including information associated with the sequence of states of the electronic device to perform at least part of the task, and
in response to receiving the first response, perform the at least part of the task by controlling the electronic device to enter the sequence of the states by using the at least one of the plurality of application programs.

2. The electronic device of claim 1,
wherein the memory is further configured to store a service component associated with an intelligence assistant, and
wherein the instructions, when executed, further cause the at least one processor to, before receiving the first response, establish communication between the at least one of the plurality of application programs and the service component.

3. The electronic device of claim 2, wherein the communication includes inter-process communication (IPC).

4. The electronic device of claim 3,
wherein the instructions comprise an operating system, and
wherein the instructions, when executed, further cause the at least one processor to start the communication by using a binder mechanism or framework.

5. The electronic device of claim 1,
wherein the plurality of application programs include a first type application program and a second type application program, and
wherein the instructions, when executed, further cause the at least one processor to:
when the at least one of the plurality of application programs comprises the first type application program, perform the at least part of the task based on the sequence of states; and
when the at least one of the plurality of application programs comprises the second type application program, perform the at least part of the task based on an actor received from the external server, the actor comprising a program for controlling the second type application or an application programming interface (API) set.

6. The electronic device of claim 1, wherein the instructions, when executed, further cause the at least one processor to identify the at least one of the plurality of application programs based on a category in which the first user utterance is included.

7. The electronic device of claim 1, wherein the instructions, when executed, further cause the at least one processor to identify the at least one of the plurality of application programs based on another portion adjacent to a specified portion of the text.

8. An electronic device comprising:
a housing;
a speaker disposed in a first area of the housing;
a microphone disposed in a second area of the housing;
a display disposed in a third area of the housing;
a communication circuit disposed inside the housing or attached to the housing;
at least one processor disposed inside the housing and operatively connected to the speaker, the microphone, the display, and the communication circuit; and
a memory disposed inside the housing, operatively connected to the at least one processor, and configured to store a plurality of application programs and instructions,
wherein the instructions, when executed, cause the at least one processor to:
receive, through the microphone, a user utterance,
transmit, through the communication circuit, the user utterance to an external server,
receive, through the communication circuit from the external server, text data corresponding to the user utterance,
in response to receiving the text data, identify a first application program of the plurality of application programs based on at least part of the text data,
in response to identifying the first application program, establish communication between the first application program and a control program capable of executing the plurality of application programs while the external server creates or determines a sequence of states of the electronic device,
after establishing the communication between the first application program and the control program, receive, through the communication circuit from the external server, the sequence of states of the electronic device,
compare the first application program and a second application program executable based on the sequence of states, and execute the first application program or the second application program based on a result of the comparing.

9. The electronic device of claim 8, wherein the instructions, when executed, further cause the at least one processor to, when the first application program corresponds to the second application program, execute the first application program.

10. The electronic device of claim 8, wherein the instructions, when executed, further cause the at least one processor to, when the first application program does not correspond to the second application program, establish communication between the second application program and the control program.

11. The electronic device of claim 10, wherein the instructions, when executed, further cause the at least one processor to, when the communication between the second application program and the control program is established, execute the second application program.

12. The electronic device of claim 8, wherein the instructions, when executed, further cause the at least one processor to receive, through the communication circuit, data indicating whether the user utterance is terminated.

13. The electronic device of claim 8, wherein the instructions, when executed, further cause the at least one processor to sequentially receive, through the communication circuit, pieces of text data generated based on an order in which the user utterance is entered into the electronic device.

14. The electronic device of claim 8,
wherein the text data includes identification data corresponding to each of the plurality of application programs, and
wherein the instructions, when executed, further cause the at least one processor to identify the first application program based on the identification data.

15. The electronic device of claim 8, wherein the instructions, when executed, further cause the at least one processor to identify at least one of the plurality of application programs based on a category in which the user utterance is included.

16. An electronic device comprising:
a housing;
a speaker disposed in a first area of the housing;
a microphone disposed in a second area of the housing;
a display disposed in a third area of the housing;
a communication circuit disposed inside the housing or attached to the housing;
at least one processor disposed inside the housing and operatively connected to the speaker, the microphone, the display, and the communication circuit; and
a memory disposed inside the housing, operatively connected to the at least one processor, and configured to store a plurality of application programs and instructions,
wherein the instructions, when executed, cause the at least one processor to:
receive, through the microphone, a first user utterance including a request to perform a task by using at least one of the plurality of application programs,
in response to receiving the user utterance, compare the first user utterance with a second user utterance stored in the memory, and
when a result of the comparing indicates that a degree of matching between the first user utterance and the second user utterance is at a threshold level, perform at least part of the task based on a sequence of states of the electronic device corresponding to the second user utterance.

17. The electronic device of claim 16, wherein the instructions, when executed, further cause the at least one processor to:
receive, from an external server through the communication circuit, data indicating whether the sequence of states is refined, and
when the sequence of states is not refined, perform the at least part of the task based on the sequence of states.

18. The electronic device of claim 17, wherein the instructions, when executed, further cause the at least one processor to:
when the sequence of states is refined, receive, from the external server through the communication circuit, the refined sequence of states of the electronic device, and
perform the at least part of the task based on the refined sequence of states of the electronic device.

19. The electronic device of claim 16,
wherein the first user utterance includes first pulse code modulation (PCM) data corresponding to the first user utterance,
wherein the second user utterance includes second PCM data corresponding to the second user utterance, and
wherein the instructions, when executed, further cause the at least one processor to compare the first PCM data with the second PCM data.

20. The electronic device of claim 16, wherein the instructions, when executed, further cause the at least one processor to receive text data corresponding to the first user utterance.

* * * * *